US010359761B2

United States Patent
Tajima et al.

(10) Patent No.: US 10,359,761 B2
(45) Date of Patent: Jul. 23, 2019

(54) DEVICE AND METHOD OF CONTROLLING MACHINE TOOL, TO CONTROL SYNCHRONIZED OPERATION OF SPINDLE AXIS AND FEED AXIS

(71) Applicant: FANUC CORPORATION, Yamanashi (JP)

(72) Inventors: Daisuke Tajima, Yamanashi (JP); Yuuki Morita, Yamanashi (JP); Tadashi Okita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 59 days.

(21) Appl. No.: 15/813,306

(22) Filed: Nov. 15, 2017

(65) Prior Publication Data

US 2018/0136630 A1 May 17, 2018

(30) Foreign Application Priority Data

Nov. 16, 2016 (JP) .................................. 2016-223234

(51) Int. Cl.
*G05B 19/402* (2006.01)
*G05B 19/406* (2006.01)
*G05B 19/416* (2006.01)

(52) U.S. Cl.
CPC ......... *G05B 19/402* (2013.01); *G05B 19/406* (2013.01); *G05B 19/416* (2013.01); *G05B 2219/41015* (2013.01)

(58) Field of Classification Search
CPC .. G05B 19/402; G05B 19/406; G05B 19/416; G05B 2219/41015

(Continued)

(56) References Cited

U.S. PATENT DOCUMENTS 4,879,660 A * 11/1989 Asakura ............... G05B 19/186
  700/173
5,132,912 A * 7/1992 Ito ........................ G05B 19/186
  318/571

(Continued)

FOREIGN PATENT DOCUMENTS

CN 101339428 A 1/2009
CN 105527928 A 4/2016

(Continued)

*Primary Examiner* — Brian W Wathen
*Assistant Examiner* — Alicia M. Choi
(74) *Attorney, Agent, or Firm* — Hauptman Ham, LLP

(57) ABSTRACT

A controller controlling a synchronized operation of spindle and feed axes. A positioning-motion control section of a spindle-axis control section calculates a first velocity command making a spindle axis perform a decelerated rotation at a variable deceleration lower than a maximum deceleration during an acceleration-varying time just after the spindle axis reaches an intermediate speed or just before the spindle axis reaches a target position, and making the spindle axis perform the decelerated rotation at the maximum deceleration during a time except for the acceleration-varying time; calculates a second velocity command making the spindle axis perform a decelerated rotation at a constant deceleration lower than the maximum deceleration after the spindle axis reaches the intermediate speed; and chooses either one, achieving a lower speed, of the first and second velocity command during a period when the spindle axis operates from the intermediate speed to reach the target position.

8 Claims, 10 Drawing Sheets

(58) Field of Classification Search
USPC .......................................................... 700/188
See application file for complete search history.

(56) References Cited

U.S. PATENT DOCUMENTS

| | | | | |
|---|---|---|---|---|
| 5,184,053 A * | 2/1993 | Maruo | ................. | G05B 19/186 |
| | | | | 318/39 |
| 6,008,609 A * | 12/1999 | Sawashima | .......... | G05B 19/186 |
| | | | | 318/569 |
| 2006/0210370 A1 * | 9/2006 | Mizukami | ............ | G05B 19/186 |
| | | | | 409/66 |
| 2006/0287758 A1 * | 12/2006 | Geissdorfer | ........... | G05B 19/41 |
| | | | | 700/186 |
| 2007/0046677 A1 * | 3/2007 | Hong | ..................... | G05B 19/41 |
| | | | | 345/442 |
| 2013/0300337 A1 * | 11/2013 | Nagaoka | .............. | G05B 19/416 |
| | | | | 318/671 |
| 2015/0081084 A1 * | 3/2015 | Nishiwaki | ................ | B23G 1/16 |
| | | | | 700/170 |
| 2016/0291580 A1 * | 10/2016 | Morita | ................. | G05B 19/416 |
| 2016/0357171 A1 * | 12/2016 | Morita | ............... | G05B 19/4141 |
| 2017/0028490 A1 * | 2/2017 | Morita | .................... | B23G 1/16 |
| 2017/0131704 A1 * | 5/2017 | Nishimura | ........... | G05B 19/402 |
| 2017/0277160 A1 * | 9/2017 | Morita | ................... | G05B 19/29 |

FOREIGN PATENT DOCUMENTS

| | | |
|---|---|---|
| CN | 106020130 A | 10/2016 |
| JP | 2629729 B2 | 7/1997 |
| JP | H10-78810 A | 3/1998 |
| JP | 2003-181722 A | 7/2003 |
| JP | 2004-202594 A | 7/2004 |
| JP | 3553741 B2 | 8/2004 |
| JP | 2016-18388 A | 2/2016 |
| JP | 2016078223 A | 5/2016 |
| JP | 2016-190272 A | 11/2016 |

* cited by examiner

DEVICE AND METHOD OF CONTROLLING MACHINE TOOL, TO CONTROL SYNCHRONIZED OPERATION OF SPINDLE AXIS AND FEED AXIS

RELATED APPLICATIONS

The present application claims priority to Japanese Patent Application No. 2016-223234 filed Nov. 16, 2016, the disclosure of which is hereby incorporated by reference herein in its entirety.

BACKGROUND OF THE INVENTION

1. Field of the Invention

The present invention relates to a device of controlling a machine tool, to control a synchronized operation of a spindle axis and a feed axis. The present invention also relates to a method of controlling a machine tool, to control a synchronized operation of a spindle axis and a feed axis.

2. Description of the Related Art

In a machine tool capable of performing a tapping process by a synchronized operation of a spindle (or principal) axis and a feed axis, various kinds of configurations for improving processing accuracy and reducing cycle time have been proposed. For example, Japanese Patent No. 2629729 (JP2629729B) discloses a thread forming apparatus that performs a tapping process by operating a feed axis to follow the rotation of a spindle axis, in which a feed command value for the feed axis is computed based on the rotational speed and rotational acceleration of the spindle axis and a thread pitch, and the feed command value is corrected in accordance with the actual rotational position of the spindle axis, so as to improve tapping accuracy. On the other hand, Japanese Patent No. 3553741 (JP3553741B) discloses a method of acceleration and deceleration control of a spindle motor, executed by a numerical control unit that performs synchronization control of a spindle axis and a feed axis for a tapping process, in which the numerical control unit prepares an acceleration and deceleration command in conformity with the power characteristics of the spindle axis, and controls the spindle axis based on the acceleration and deceleration command to improve the response of the spindle axis, so as to reduce cycle time.

Japanese Unexamined Patent Publication No. 2016-078223 (JP 2016-078223 A) describes a controller of a machine tool, having a configuration for controlling a synchronized operation of a spindle axis and a feed axis, wherein a numerical control section sends a spindle-axis command to the spindle-axis control section, based on a tapping program, the spindle-axis command including a total rotation amount and a maximum rotation speed of the spindle axis during a period when the spindle axis operates from a starting position to a target position, and a spindle-axis control section makes the spindle axis automatically perform an accelerated and decelerated rotation at maximum capacity in accordance with the spindle-axis command, so as to perform a tapping process.

SUMMARY OF THE INVENTION

In a machine tool capable of performing a tapping process by a synchronized operation of a spindle axis and a feed axis, cycle time is generally determined depending on the acceleration capacity of the spindle axis. In a configuration in which the cycle time is reduced by controlling the spindle axis so as to maximize the acceleration capacity thereof, it is desirable, during the rotational motion of the spindle axis, to reduce a mechanical or structural shock that may be caused on the spindle axis due to the change in acceleration, and to reduce a synchronization error that may be caused between the spindle axis and the feed axis due to the change in acceleration.

One aspect of the invention provides a controller of a machine tool, configured to control a synchronized operation of a spindle axis and a feed axis, the controller comprising a numerical control section configured to prepare a spindle-axis command and a feed-axis command based on a tapping program; a spindle-axis control section configured to control a rotational motion of the spindle axis in accordance with the spindle-axis command; a rotation detecting section configured to detect a rotational position of the spindle axis; and a feed-axis control section configured to control a feed motion of the feed axis in accordance with the feed-axis command, based on the rotational position; the numerical control section comprising a spindle-axis command outputting section configured to obtain, from the tapping program, a total rotation amount and a maximum rotation speed of the spindle axis during a period when the spindle axis operates from a starting position to a target position, and to send the total rotation amount and the maximum rotation speed as the spindle-axis command to the spindle-axis control section; the spindle-axis control section comprising an initial-motion control section configured to make the spindle axis perform an accelerated rotation at maximum capacity using a maximum permissible current of a drive source from the starting position, by a velocity control in which the maximum rotation speed is set as a target value; a maximum-acceleration detecting section configured to detect a maximum acceleration of the spindle axis during the accelerated rotation at maximum capacity, based on the rotational position; a residual rotation-amount detecting section configured to detect a residual rotation amount of the spindle axis during a period when the spindle axis operates from a current position to the target position, based on the total rotation amount and the rotational position; a current-speed detecting section configured to detect a current speed of the spindle axis based on the rotational position; a decelerating-motion control section configured to execute a velocity control for making the spindle axis perform a decelerated rotation so as to reach a predetermined intermediate speed, based on the residual rotation amount and the current speed, after the accelerated rotation at maximum capacity; and a positioning-motion control section configured to execute a position control for making the spindle axis perform a decelerated rotation so as to reach the target position, based on the maximum acceleration, the residual rotation amount and the current speed, after the spindle axis reaches the intermediate speed. The decelerating-motion control section is configured to successively update a velocity command for the velocity control with use of the residual rotation amount and the current speed, and to make the spindle axis perform the decelerated rotation by the successively updated velocity command so that the residual rotation amount at an instant when the spindle axis reaches the intermediate speed becomes equal to a positioning rotation amount of the spindle axis required for the spindle axis to reach the target position under the position control. The positioning-motion control section includes a first-velocity-command calculating section configured to calculate a first velocity command for the position control, the first velocity command making the spindle axis perform the decelerated rotation at a maximum deceleration corresponding to the maximum acceleration, during a time except for a predetermined acceleration-varying time just after the spindle axis reaches the intermediate speed and just before the spindle axis reaches the target position, and making the spindle axis perform the decelerated rotation at a variable deceleration lower than the maximum deceleration and varying at a predetermined rate, during the acceleration-varying time; a second-velocity-command calculating section configured to calculate a second velocity command for the position control, the second velocity command making the spindle axis perform the decelerated rotation at a constant deceleration lower than the maximum deceleration after the spindle axis reaches the intermediate speed; and a velocity-command choosing section configured to choose a velocity command achieving a lower speed, which is either one of the first velocity command and the second velocity command, during a period when the spindle axis operates from the intermediate speed to reach the target position.

Another aspect of the invention provides a method of controlling a machine tool, configured to control a synchronized operation of a spindle axis and a feed axis, the method comprising the steps, executed by a controller, of obtaining, from a tapping program, a total rotation amount and a maximum rotation speed of the spindle axis during a period when the spindle axis operates from a starting position to a target position; making the spindle axis perform an accelerated rotation at maximum capacity using a maximum permissible current of a drive source from the starting position, by a velocity control in which the maximum rotation speed is set as a target value; detecting a maximum acceleration of the spindle axis during the accelerated rotation at maximum capacity, based on a rotational position feedback of the spindle axis; detecting a residual rotation amount of the spindle axis during a period when the spindle axis operates from a current position to the target position, based on the total rotation amount and the rotational position feedback; detecting a current speed of the spindle axis based on the rotational position feedback; executing a velocity control for making the spindle axis perform a decelerated rotation so as to reach a predetermined intermediate speed, based on the residual rotation amount and the current speed, after the accelerated rotation at maximum capacity; and executing a position control for making the spindle axis perform a decelerated rotation so as to reach the target position, based on the maximum acceleration, the residual rotation amount and the current speed, after the spindle axis reaches the intermediate speed. The step to reach the predetermined intermediate speed includes successively updating a velocity command for the velocity control with use of the residual rotation amount and the current speed, and making the spindle axis perform the decelerated rotation by the successively updated velocity command so that the residual rotation amount at an instant when the spindle axis reaches the intermediate speed becomes equal to a positioning rotation amount of the spindle axis required for the spindle axis to reach the target position under the position control. The step to reach the target position includes calculating a first velocity command for the position control, the first velocity command making the spindle axis perform the decelerated rotation at a maximum deceleration corresponding to the maximum acceleration, during a time except for a predetermined acceleration-varying time just after the spindle axis reaches the intermediate speed or just before the spindle axis reaches the target position, and making the spindle axis perform the decelerated rotation at a variable deceleration lower than the maximum deceleration and varying at a predetermined rate, during the acceleration-varying time; calculating a second velocity command for the position control, the second velocity command making the spindle axis perform the decelerated rotation at a constant deceleration lower than the maximum deceleration after the spindle axis reaches the intermediate speed; and choosing a velocity command achieving a lower speed, which is either one of the first velocity command and the second velocity command, during a period when the spindle axis operates from the intermediate speed to reach the target position.

The controller according to one aspect has a configuration wherein, when the spindle axis performs the rotational motion from the starting position to the target position, the numerical control section instructs only the total rotation amount and the maximum rotation speed, of the spindle axis, as the spindle axis command to the spindle-axis control section, and the spindle-axis control section performs, in accordance with the spindle axis command, the rotational motion by accelerating the spindle axis with the maximum power using the maximum permissible current, aiming at the maximum rotation speed, and continuously performs, based on the maximum acceleration detected during the maximum accelerated rotation as well as the sequentially detected residual rotation amount and current speed of the spindle axis, the rotational motion until the target position while decelerating the spindle axis at an optimum deceleration so as to make the spindle axis reach the target position. Accordingly, it is no longer necessary to perform a parameter setting or adjustment, etc., required for the numerical control section to prepare acceleration and deceleration commands in conformity with the power characteristics of the spindle axis, and it is possible, with a simple configuration, to reduce the cycle time of a tapping process by executing an acceleration and deceleration control so as to maximize the acceleration capacity of the spindle axis. Further, the controller is configured so that, during the decelerated rotation of the spindle axis, the decelerating-motion control section executes the velocity control for the spindle axis by the successively updated velocity command, so as to suppress a change in the deceleration just before a control switching point at which the velocity control is switched to the position control, and the velocity-command choosing section of the positioning-motion control section chooses either one, achieving the lower speed, of the first velocity command calculated by the first-velocity-command calculating section and the second velocity command calculated by the second-velocity-command calculating section, during the position control executed between the control switching point and the target position, so as to suppress both of a change in the deceleration caused when the control is switched at the control switching point and a shock caused when the spindle axis is stopped at the target position. Consequently, according to the present controller, it is possible to reduce a mechanical or structural shock that may be caused on the spindle axis due to the change in acceleration, and to reduce a synchronization error that may be caused between the spindle axis and the feed axis due to the change in acceleration, during the decelerated rotation of the spindle axis.

In the control method according to the other aspect, effects corresponding to those achieved by the above-described controller can be obtained.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Figure 1:
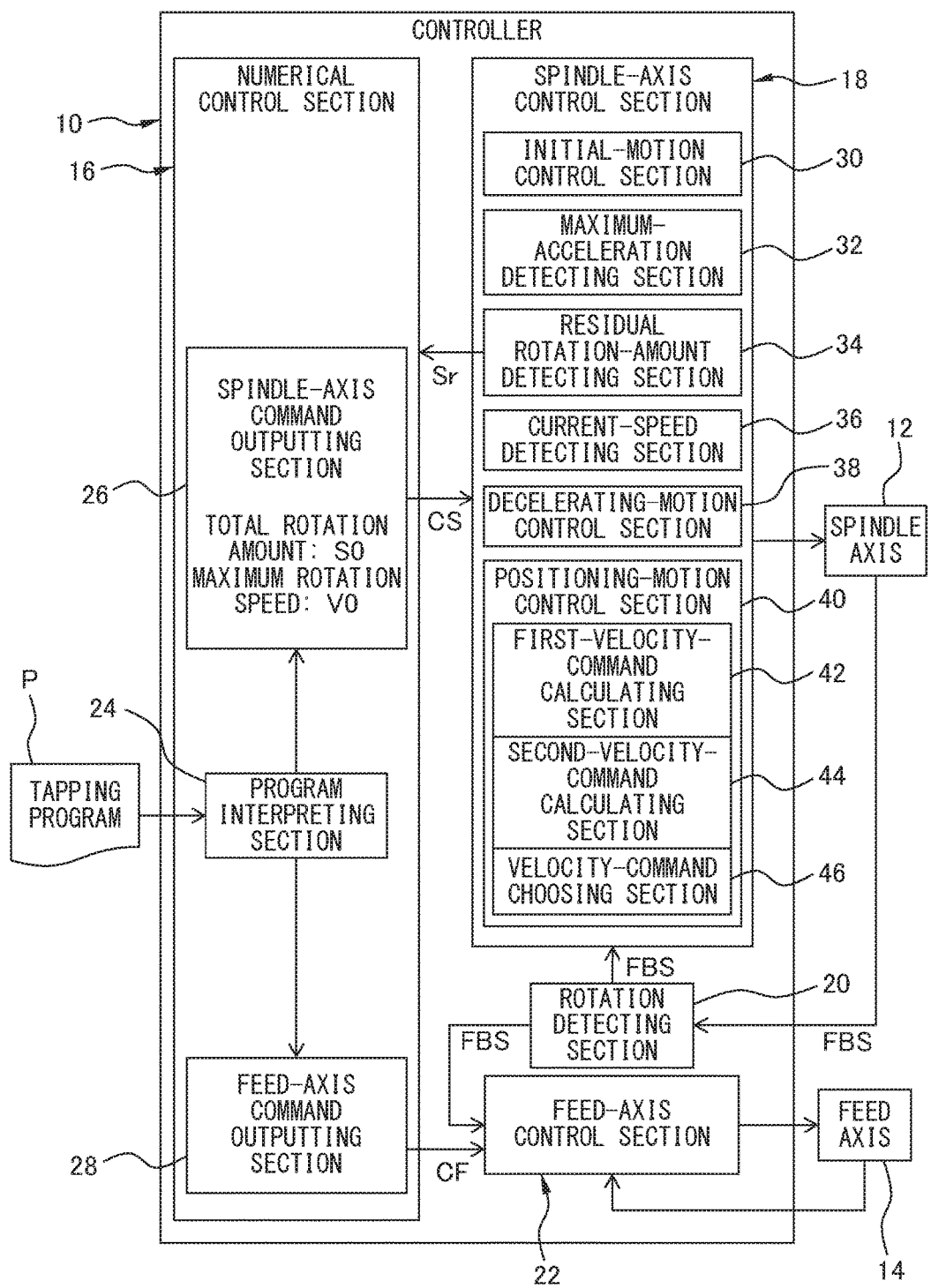
FIG. 1 is a functional block diagram depicting a configuration of one embodiment of a machine tool controller.

Embodiments of the present disclosure will be described below with reference to the accompanying drawings. Throughout the drawings, corresponding components are denoted by common reference numerals.

FIG. 1 is a functional block diagram depicting a configuration of a device 10 of controlling (i.e., a controller 10 of) a machine tool, according to one embodiment. The controller 10 has a configuration for controlling a synchronized operation (so called a master-slave synchronization) of a spindle axis 12 and a feed axis 14, in a machine tool (e.g., a lathe, a drilling machine, a machining center, etc.) capable of performing a tapping process by the synchronized operation, in which the feed axis 14 operates to follow the rotational motion of the spindle axis 12 by taking into account a thread pitch designated by a tapping program P. The spindle axis 12 is a control axis provided for a spindle motor (not depicted) that rotates a hold unit for holding a workpiece or a tool at a necessary speed for processing. The feed axis 14 is a control axis provided for a servo motor (not depicted) that feeds a support unit for supporting a workpiece or a tool at a necessary speed for processing. For example, in a lathe, the tool may be linearly fed by the feed axis 14 relative to the workpiece rotated by the spindle axis 12, or alternatively, the workpiece rotated by the spindle axis 12 may be linearly fed by the feed axis 14 relative to the tool. On the other hand, in a drilling machine, the tool rotated by the spindle axis 12 may be linearly fed by the feed axis 14 relative to the workpiece, or alternatively, the workpiece may be linearly fed by the feed axis 14 relative to the tool rotated by the spindle axis 12. In any of the cases, the feed axis 14 that has a relatively wide margin of acceleration/deceleration torque during operation operates to follow the spindle axis 12 that has a relatively less margin of acceleration/deceleration torque during operation, whereby it is possible to reduce a synchronization error and improve a processing accuracy. It should be noted that, in the present disclosure, the configuration of the machine tool is not particularly limited.

The controller 10 includes a numerical control section 16 configured to prepare a spindle-axis command CS and a feed-axis command CF, based on a tapping program P; a spindle-axis control section 18 configured to control a rotational motion of the spindle axis 12 in accordance with the spindle-axis command CS; a rotation detecting section 20 configured to detect a rotational position of the spindle axis 12; and a feed-axis control section 22 configured to control a feed motion of the feed axis 14 in accordance with the feed-axis command CF, based on the rotational position detected by the rotation detecting section 20. The numerical control section 16 includes a program interpreting section 24 configured to interpret the tapping program P; a spindle-axis command outputting section 26 configured to prepare the spindle-axis command CS in accordance with the interpretation of the program interpreting section 24 and send the spindle-axis command CS to the spindle-axis control section 18; and a feed-axis command outputting section 28 configured to prepare the feed-axis command CF in accordance with the interpretation of the program interpreting section 24 and send the feed-axis command CF to the feed-axis control section 22. The numerical control section 16 may include a hardware configuration of a conventional CNC unit.

Before starting a tapping process, the spindle-axis command outputting section 26 obtains, from a command value provided in the tapping program P interpreted by the program interpreting section 24, a total rotation amount S0 and a maximum rotation speed V0, of the spindle axis 12, during a period when the spindle axis operates from a starting position (a rotational position) to a target position (a rotational position), and sends the total rotation amount S0 and the maximum rotation speed V0 as the spindle-axis command CS to the spindle-axis control section 18. For example, in the case where the tapping program P includes instructions for processing an internal thread having a thread pitch of 1.25 mm and a thread depth of 30 mm with the maximum rotation speed (maximum revolutions per minute, in this example) V0 of the spindle axis 12 set at 3000 rev/min, the total rotation amount S0 of the spindle axis 12, from a process start position as the starting position to a target thread depth as the target position, is calculated as 30÷1.25=24 (rev). Accordingly, the spindle-axis command outputting section 26 notifies the spindle-axis control section 18 of V0=3000 (rev/min) and S0=24 (rev). In this way, the spindle-axis command CS does not include a position command (or movement command) and/or an acceleration/deceleration command, which makes the spindle axis 12 perform a rotational motion until the target position (or target thread depth).

The spindle-axis control section 18 controls the rotational motion of the spindle axis 12 by a conventional feedback control, with use of a rotational position FBS (i.e., a feedback value) of the spindle axis 12 detected by the rotation detecting section 20. The feed-axis control section 22 controls the feed motion of the feed axis 14, which follows the motion of the spindle axis 12, by a feedback control, with use of the rotational position FBS of the spindle axis 12 in addition to the feedback value of the feed position of the feed axis 14. The rotation detecting section 20 can obtain the rotational position FBS from the output of a position detector (not depicted), such as an encoder, etc., for detecting the operating position of the spindle axis 12 or the spindle motor.

The spindle-axis control section 18 includes an initial-motion control section 30 configured to make the spindle axis 12 perform an accelerated rotation at maximum capacity using a maximum permissible current of a drive source, from the starting position by a velocity control in which the maximum rotation speed V0, sent from the spindle-axis command outputting section 26, is set as a target value; a maximum-acceleration detecting section 32 configured to detect a maximum acceleration A0 (unit may be represented as, e.g., rev/min$^2$) of the spindle axis 12 during the accelerated rotation at maximum capacity, based on the rotational position FBS; a residual rotation-amount detecting section 34 configured to detect a residual rotation amount Sr of the spindle axis 12 during a period when the spindle axis operates from a current position (a rotational position) to the target position, based on the total rotation amount S0, sent from the spindle-axis command outputting section 26, and the rotational position FBS; a current-speed detecting section 36 configured to detect a current speed Vc of the spindle axis 12 based on the rotational position FBS; a decelerating-motion control section 38 configured to execute a velocity control for making the spindle axis 12 perform a decelerated rotation so as to reach a predetermined intermediate speed Vb, based on the residual rotation amount Sr and the current speed Vc, after the accelerated rotation at maximum capacity; and a positioning-motion control section 40 configured to execute a position control for making the spindle axis 12 perform a decelerated rotation so as to reach the target position, based on the maximum acceleration A0, the residual rotation amount Sr and the current speed Vc, after the spindle axis 12 reaches the intermediate speed Vb.

The intermediate speed Vb is previously determined for the spindle axis 12 as a rotational speed (e.g., a base speed of the spindle motor) by which an acceleration with a constant torque (i.e., a constant acceleration) can be performed from the start of operation to the intermediate speed Vb, and may be stored as one of control parameters in a memory (not depicted) of the controller 10. In practice, the intermediate speed Vb may take any value lower than or equal to the base speed of the spindle motor (or a speed determined by taking into account a reduction ratio, if any, between the spindle motor and the spindle axis 12).

The spindle axis 12 makes a transition from the accelerated rotation controlled by the initial-motion control section 30 to the decelerated rotation controlled by the decelerating-motion control section 38, at an instant when the spindle axis reaches the maximum rotation speed V0 or reaches a position where the residual rotation amount Sr is equal to one-half of the total rotation amount S0. In a speed range of the spindle axis 12 from the maximum speed of the accelerated rotation to the intermediate speed Vb, the decelerating-motion control section 38 executes the velocity control to make the spindle axis 12 perform the decelerated rotation at an optimum deceleration which takes into account both of the reduction of cycle time and the reduction of shock on the spindle axis 12 or synchronization error between the spindle axis 12 and the feed axis 14. On the other hand, in a speed range of the spindle axis 12 from the intermediate speed Vb to the target position, the positioning-motion control section 40 executes the position control to make the spindle axis 12 perform the decelerated rotation at an optimum deceleration which takes into account both of the reduction of cycle time and the reduction of shock on the spindle axis 12 or synchronization error between the spindle axis 12 and the feed axis 14. To this end, the positioning-motion control section 40 monitors the residual rotation amount Sr and the current speed Vc, which are sequentially detected by the residual rotation-amount detecting section 34 and the current-speed detecting section 36, respectively, and calculates a position (hereinafter referred to as a control switching point) at which it is expected that "Sr" becomes equal to zero (i.e., the spindle axis reaches the target position) if the spindle axis 12 is decelerated from the current speed Vc (=Vb) at the optimum deceleration, and starts the position control at an instant when the spindle axis 12 reaches the control switching point.

When taking into account the reduction of cycle time, it is possible for the decelerating-motion control section 38 to make the spindle axis 12 perform the decelerated rotation at maximum capacity using a maximum permissible current of a drive source, by a velocity control in which the intermediate speed Vb is set as a target value (i.e., a command value). During the decelerated rotation at maximum capacity, the deceleration of the spindle axis 12 is gradually increased due to the characteristics of the spindle motor, and the spindle axis 12 reaches the intermediate speed Vb before reaching the control switching point (i.e., a position at which a control strategy executed by the spindle-axis control section 18 is switched from the velocity control to the position control) and thereafter rotates at the constant intermediate speed Vb for a very short time so as to reach the control switching point. In this configuration, the deceleration is changed just before the control switching point. In contrast, the present embodiment has a configuration wherein the decelerating-motion control section 38 is configured to successively update a velocity command Cv for the velocity control with use of the residual rotation amount Sr and the current speed Vc, and to make the spindle axis 12 perform the decelerated rotation by the successively updated velocity command Cv so that the residual rotation amount Sr at an instant when the spindle axis 12 reaches the intermediate speed Vb becomes equal to a positioning rotation amount Spos of the spindle axis 12 required for the spindle axis to reach the target position under the position control executed by the positioning-motion control section 40 (further details of the decelerated rotation by the velocity control will be described later). By virtue of the above configuration of the decelerating-motion control section 38, the present embodiment suppresses a change in deceleration immediately before the control switching point.

Also when taking into account the reduction of cycle time, it is possible for the positioning-motion control section 40 to make the spindle axis 12 perform the decelerated rotation at a maximum deceleration A0 (negative value) corresponding to the maximum acceleration A0 detected by the maximum-acceleration detecting section 32 from the control switching point to reach the point of Sr=0 (i.e., the target position). In this configuration, for example, at an instant when the spindle axis 12 inverts the motion thereof and starts a return motion after reaching a target thread depth as described later, the stop or inversion of the spindle axis 12 may cause a shock. In contrast, the present embodiment has a configuration wherein the positioning-motion control section 40 includes a first-velocity-command calculating section 42 configured to calculate a first velocity command Cpv1 for the position control, the first velocity command making the spindle axis 12 perform the decelerated rotation at the maximum deceleration A0, during a time except for a predetermined acceleration-varying time t1 just after the spindle axis 12 reaches the intermediate speed Vb and just before the spindle axis 12 reaches the target position, and making the spindle axis 12 perform the decelerated rotation at a variable deceleration A1 lower than the maximum deceleration A0 and varying at a predetermined rate, during the acceleration-varying time t1. The first-velocity-command calculating section 42 generates the first velocity command Cpv1 for effecting a so-called bell-shaped deceleration, in which the acceleration-varying time t1 is provided not only immediately before the spindle axis 12 reaches the target position but also immediately after the spindle axis 12 reaches the intermediate speed Vb, in terms mainly of the ease of calculation of the first velocity command Cpv1 (and thus a reduction in processing time or data capacity).

If the configuration wherein the first-velocity-command calculating section 42 of the positioning-motion control section 40 generates the first velocity command Cpv1 for effecting the bell-shaped deceleration is adopted in addition to the aforementioned configuration wherein the decelerating-motion control section 38 makes the spindle axis 12 perform the decelerated rotation by the successively updated velocity command Cv, a change in deceleration may be caused at the control switching point where the velocity control is switched to the position control. To address this concern, the present embodiment has a configuration wherein the positioning-motion control section 40 further includes a second-velocity-command calculating section 44 configured to calculate a second velocity command Cpv2 for the position control, the second velocity command making the spindle axis 12 perform the decelerated rotation at a constant deceleration Acons lower than the maximum deceleration A0 after the spindle axis 12 reaches the intermediate speed Vb; and a velocity-command choosing section 46 configured to choose a velocity command achieving a lower speed, which is either one of the first velocity command Cpv1 and the second velocity command Cpv2, during a period when the spindle axis 12 operates from the intermediate speed Vb to reach the target position (further details of the decelerated rotation by the position control will be described later). By virtue of the above configuration of the positioning-motion control section 40, the present embodiment suppresses both of a change in the deceleration caused at the control switching point and a shock caused at the stop or inversion of the spindle axis.

The controller 10 is capable of controlling, in a tapping process using a machine tool, a rotational motion of the spindle axis 12 for cutting a pilot hole of a workpiece with a tool until a target thread depth (referred to as a cutting motion, in this application). Also, the controller 10 is capable of controlling, in a tapping process using a machine tool, a rotational motion of the spindle axis 12 for pulling out a tool from a workpiece after cutting a pilot hole of the workpiece until a target thread depth (referred to as a return motion, in this application). In the control of the cutting motion, the "starting position" corresponds to a "process start position" of the tapping process, and the "target position" corresponds to a "target thread depth" of the tapping process. In the control of the return motion, the "starting position" corresponds to a "target thread depth" of the tapping process, and the "target position" corresponds to a "return completion position" of the tapping process.

Figure 2:
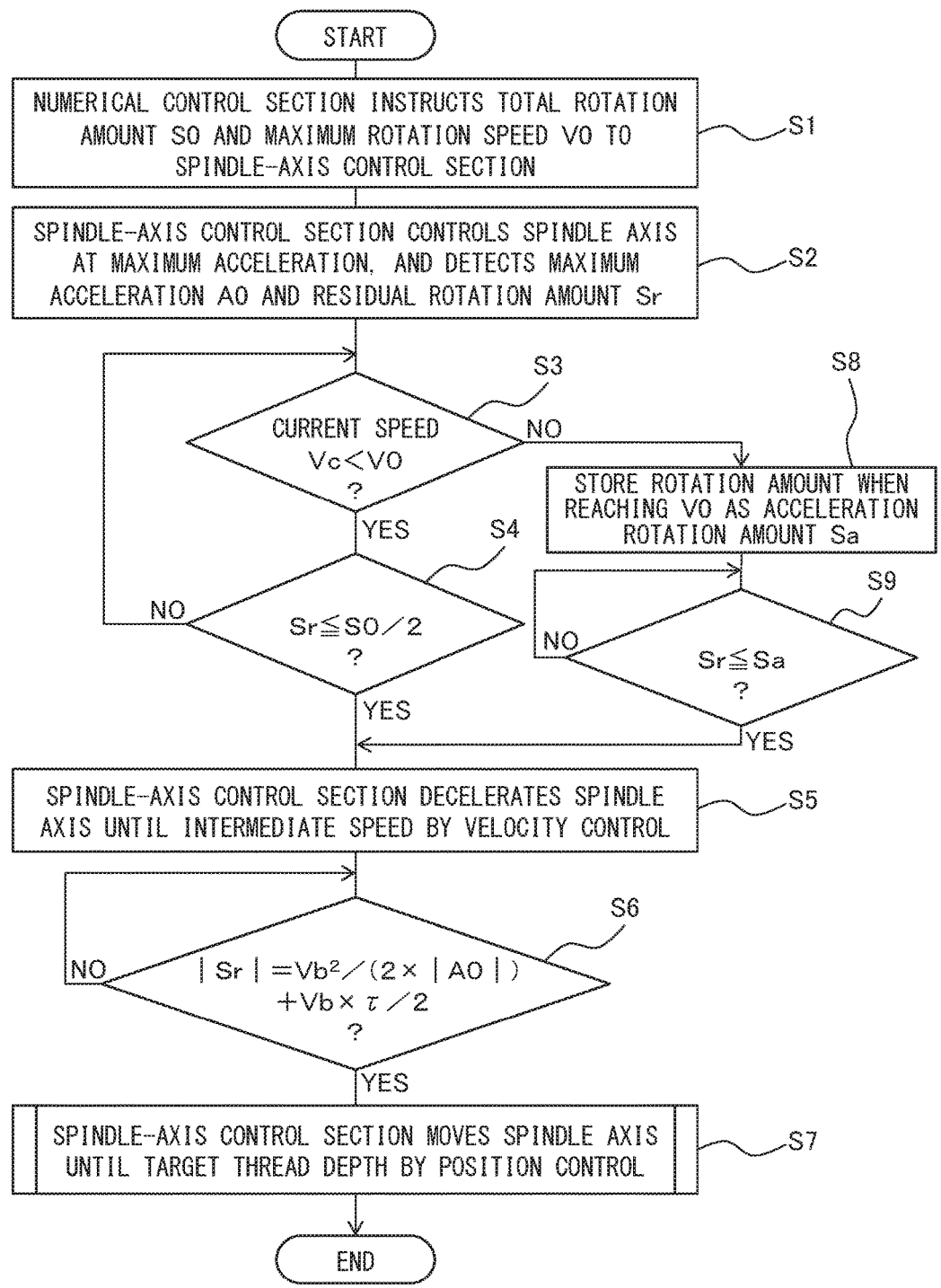
FIG. 2 is a flowchart depicting a cutting motion control method for a tapping process, which is one embodiment of a machine tool control method.
Figure 3:
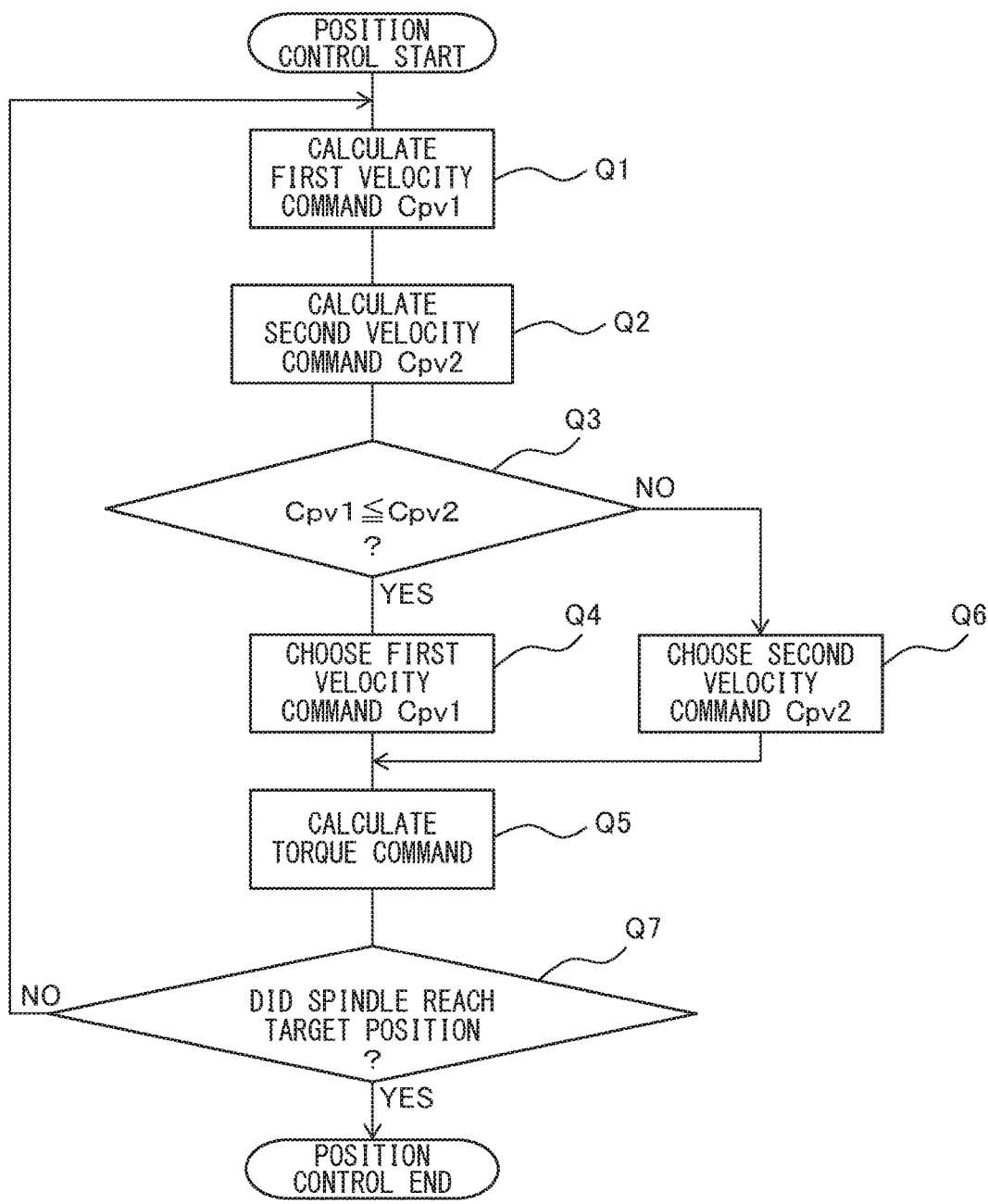
FIG. 3 is a flowchart depicting a position control routine in the embodiment of FIG. 2.
Figure 4:
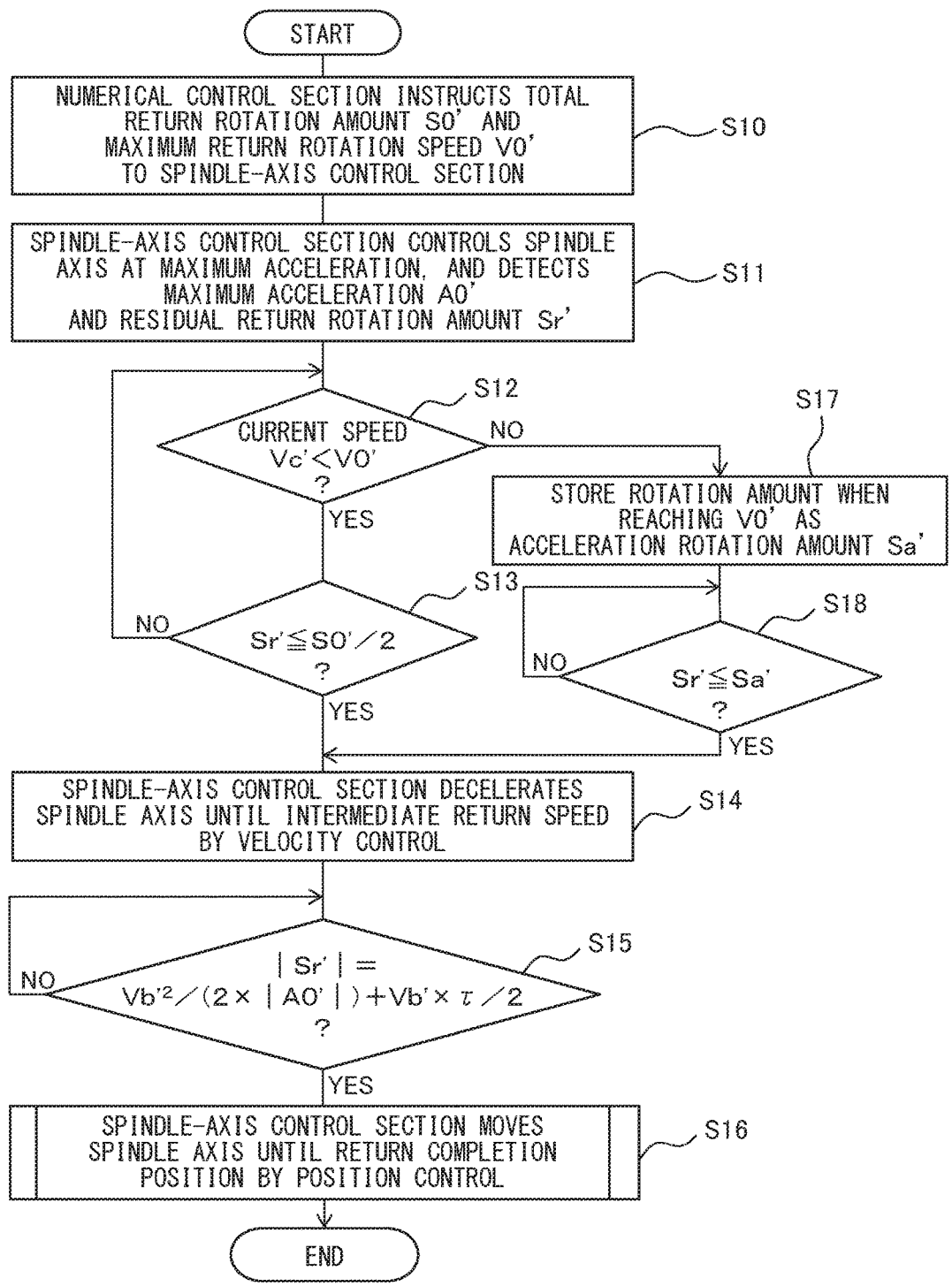
FIG. 4 is a flowchart depicting a return motion control method for a tapping process, which is one embodiment of a machine tool control method.
Figure 5:
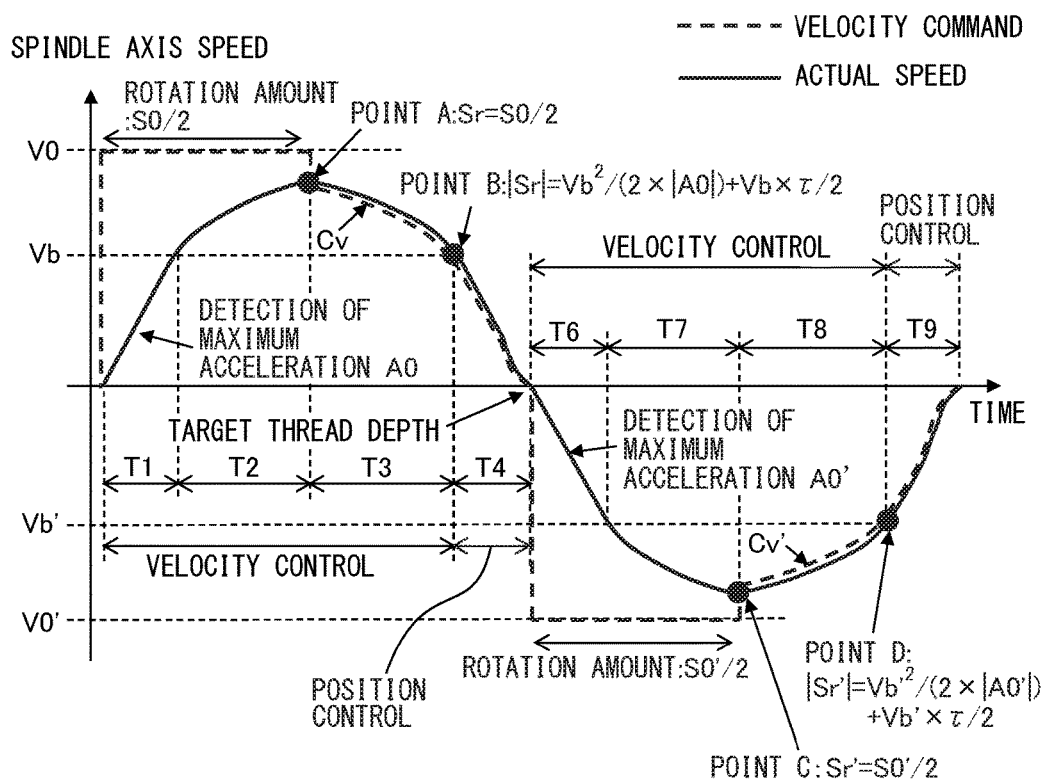
FIG. 5 is a diagram depicting one example of the motion of a spindle axis, achieved in the embodiment of FIGS. 1-4.
Figure 6:
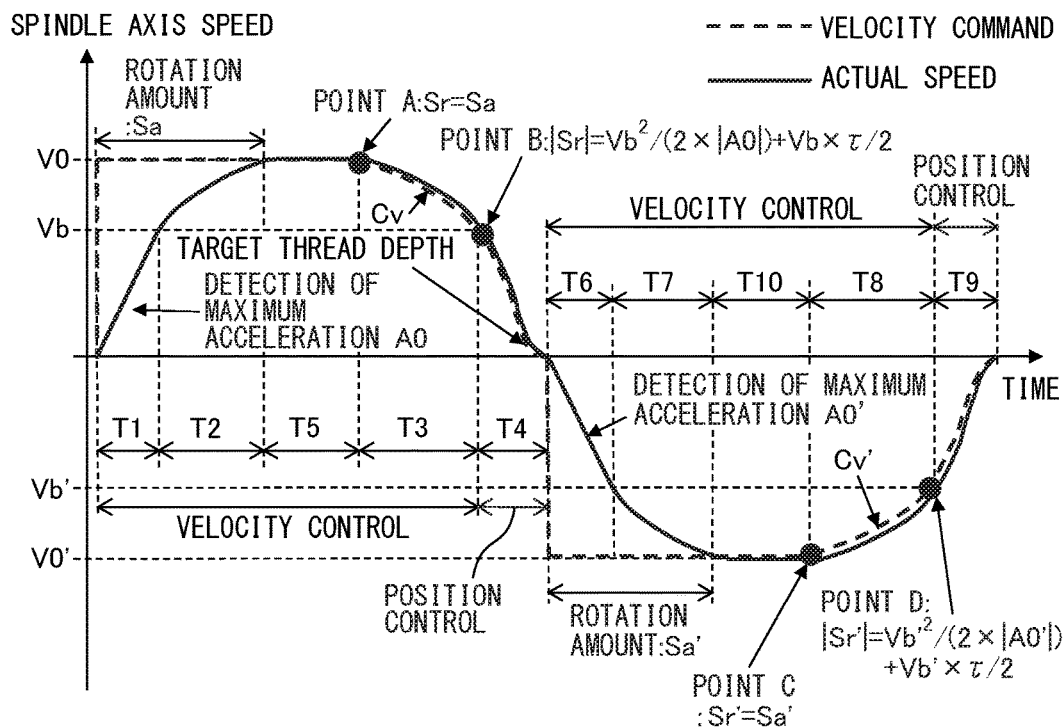
FIG. 6 is a diagram depicting another example of the motion of a spindle axis, achieved in the embodiment of FIGS. 1-4.

FIGS. 2 to 4 depict the first embodiment of a method of controlling a machine tool, executed by the controller 10. FIGS. 5 and 6 depict two different examples of motions of the spindle axis 12, achieved by the control method of FIGS. 2-4. The control method according to the illustrated embodiment may control both of the cutting motion (FIG. 2) and the return motion (FIG. 4) of the spindle axis 12 in the tapping process. For better understanding, the following description uses the terms "total rotation amount", "maximum rotation speed", "accelerated rotation", "residual rotation amount", "current speed", "decelerated rotation", "intermediate speed", "deceleration" and "positioning rotation amount" in relation to the control of the cutting motion, while uses respectively corresponding, substantially synonymous terms "total return-rotation amount", "maximum return-rotation speed", "accelerated inverse rotation", "residual return-rotation amount", "current speed of inverse rotation", "decelerated inverse rotation", "intermediate return-speed", "deceleration of inverse rotation" and "positioning return-rotation amount" in relation to the control of the return motion.

First, a method of controlling the cutting motion of the spindle axis 12, executed by the controller 10, will be described below with reference to a flow chart illustrated in FIGS. 2 and 3 together with FIG. 1. At step S1, the numerical control section 16 (the spindle-axis command outputting section 26) obtains, from a command value provided in the tapping program P interpreted by the program interpreting section 24, the total rotation amount S0 and the maximum rotation speed V0, of the spindle axis 12, during a period when the spindle axis operates from the process start position (or starting position) to the target thread depth (or target position), and instructs the total rotation amount S0 and the maximum rotation speed V0 to the spindle-axis control section 18. At step S2, the spindle-axis control section 18 (the initial-motion control section 30, the maximum-acceleration detecting section 32 and the residual rotation-amount detecting section 34) makes the spindle axis 12 perform the accelerated rotation at maximum capacity using the maximum permissible current of the drive source to perform the cutting motion from the process start position (i.e., zero speed), by a velocity control in which the maximum rotation speed V0 is set as a target speed, detects the maximum acceleration A0 during the accelerated rotation at maximum capacity, and sequentially detects the residual rotation amount Sr from the current position during the accelerated rotation. The spindle-axis control section 18 notifies the detected residual rotation amount Sr to the numerical control section 16 every time it is detected.

Next, at step S3, the spindle-axis control section 18 (the current-speed detecting section 36) sequentially detects the current speed Vc during the accelerated rotation at maximum capacity, and judges whether the current speed Vc has not reached the maximum rotation speed V0 every time it is detected. If "Vc" has not yet reached "V0", the spindle-axis control section 18 (the decelerating-motion control section 38) judges, at step S4, whether the residual rotation amount Sr is equal to or less than one-half of the total rotation amount S0. If "Sr" is equal to or less than one-half of "S0", the spindle-axis control section 18 (the decelerating-motion control section 38) makes, at step S5, the spindle axis 12 perform the decelerated rotation until the intermediate speed Vb, so as to continuously perform the cutting motion. If "Sr" is not equal to or not less than one-half of "S0", the control flow returns to step S3.

Referring now to FIG. 5, one example of the cutting motion of the spindle axis 12, in the case where the residual rotation amount Sr reaches one-half of the total rotation amount S0 before the current speed Vc reaches the maximum rotation speed V0 (i.e., in the case where the judgment results at respective steps S3 and S4 are YES), is depicted by a speed-time curve (the curve above a time axis). The accelerated rotation at maximum capacity of the spindle axis 12 at step S2 is performed during time periods T1 and T2 depicted in FIG. 5, and the maximum acceleration A0 is detected during the constant acceleration in the time period T1 (i.e., a time period from a point when the spindle axis starts at the process start position to a point when the spindle axis reaches the intermediate speed Vb). When the rotational speed of the spindle axis 12 exceeds the intermediate speed Vb (the base speed of the spindle motor, in this example), the acceleration of the spindle axis 12 gradually decreases from the maximum acceleration A0 due to the characteristics of the spindle motor. At a time point A when the residual rotation amount Sr reaches one-half of the total rotation amount S0 (i.e., when the rotation amount from the start of processing reaches one-half of the total rotation amount S0) (or when the judgment result at step S4 becomes YES), the motion of the spindle axis 12 changes from the accelerated rotation to the decelerated rotation, and in time period T3, the spindle axis 12 performs the decelerated rotation at step S5. In the time periods T1, T2 and T3, the spindle-axis control section 18 executes a velocity control for the spindle axis 12 (a velocity command in these time periods is illustrated by a broken line).

During the time period T3 (step S5), the spindle-axis control section 18 (the residual rotation-amount detecting section 34 and the current-speed detecting section 36) also sequentially detects the residual rotation amount Sr from the current position and the current speed Vc, of the spindle axis 12. In the time period T3 (step S5), the spindle-axis control section 18 (the decelerating-motion control section 38) executes the velocity control to make the spindle axis 12 perform the decelerated rotation from the point A (or a maximum speed) until the intermediate speed Vb, and in the meantime, successively updates a velocity command Cv for the decelerated rotation with use of the residual rotation amount Sr and the current speed Vc (velocity command Cv is illustrated by a broken line in FIG. 5). More specifically, the decelerating-motion control section 38 successively updates the velocity command Cv and makes the spindle axis 12 perform the decelerated rotation by the successively updated velocity command Cv, so that the residual rotation amount Sr of the spindle axis 12 at an instant when the spindle axis 12 reaches the predetermined intermediate speed Vb becomes equal to a positioning rotation amount Spos of the spindle axis 12 required for the spindle axis to reach the target thread depth under the position control executed by the positioning-motion control section 40.

The positioning rotation amount Spos corresponds to a position of a time point B (FIG. 5), at which it is expected that the residual rotation amount Sr becomes equal to zero and the current speed Vc becomes equal to zero (i.e., the spindle axis reaches the target thread depth) when the positioning-motion control section 40 decelerates, while taking into account the aforementioned acceleration-varying time t1 (sec), the spindle axis 12 from the current speed Vc (hereinafter described as a rotation number per second (unit thereof being represented as rev/sec)) at the maximum deceleration A0 (negative value) corresponding to the maximum acceleration A0 (rev/sec$^2$) detected at step S2. The positioning rotation amount Spos is determined, as the absolute value of the residual rotation amount Sr (negative value) as seen from the point of Sr=0, by the following equation:

$$|Sr|=Vc^2/(2\times|A0|)+Vc\times\tau/2=Spos$$

As already described, it is assumed that the current speed Vc of the spindle axis 12 has reached the intermediate speed Vb at the point B. Thus, the position |Sr| of the point B and the positioning rotation amount Spos can be determined by the following equation 1:

$$|Sr|=Vb^2/(2\times|A0|)+Vb\times\tau/2=Spos \quad \text{equation 1}$$

In this connection, "τ" in the equation 1 is a time constant representing a change in the deceleration of the spindle axis 12 during the acceleration-varying time t1. The acceleration-varying time t1 and the time constant τ may be set by a system designer based on an experimental rule, and may be stored as one of control parameters in a memory (not depicted) of the controller 10.

If the residual rotation amount Sr at an instant when the spindle axis 12 reaches the intermediate speed Vb is equal to the positioning rotation amount Spos of the spindle axis 12, the correspondence between the residual rotation amount (i.e., the current position) Sr, the current speed Vc (rev/sec) and the current deceleration Ac (rev/sec$^2$), of the spindle axis 12 during the time period T3, is represented by the following equation:

$$|Ac|=(Vc^2-Vb^2)/(2\times(Sr-Spos))$$

based on a formula:

$$Vc^2-Vb^2=2\times|Ac|\times(Sr-Spos)$$

In the time period T3 (step S5), the spindle-axis control section 18 (the decelerating-motion control section 38) constantly monitors the residual rotation amount Sr and the current speed Vc of the spindle axis 12, and determines a new or updated velocity command Cv by subtracting a value obtained by multiplying the aforementioned current deceleration Ac by a velocity-command updating cycle Tct1 (sec) (i.e., a cycle of preparing the velocity command and notifying it to the spindle axis 12 by the decelerating-motion control section 38) from the current speed Vc (i.e., the last velocity command Cv). The velocity command Cv is represented by the following equation 2:

$$Cv=Vc-Ac\times Tct1 \quad \text{equation 2}$$

According to the equation 2, the decelerating-motion control section 38 successively updates the velocity command Cv in the velocity-command updating cycle Tct1. The spindle axis 12 performs the decelerated rotation while gradually increasing the deceleration Ac in accordance with the successively updated velocity command Cv, during the operation from the point A to the point B, and reaches the point B at an instant when being decelerated to the intermediate speed Vb (FIG. 5).

Turning back to FIG. 2, at step S6, the spindle-axis control section 18 (the positioning-motion control section 40) judges whether the absolute value |Sr| of the residual rotation amount Sr of the spindle axis 12 satisfies the equation 1: |Sr|=Vb$^2$/(2×|A0|)+Vb×τ/2 (i.e., whether or not the rotational position of the spindle axis 12 has reached the point B). If the equation 1 is satisfied, the spindle-axis control section 18 (the positioning-motion control section 40) prepares, at step S7, a movement command for making the spindle axis 12 perform the decelerated rotation at the optimum deceleration and reach the point of Sr=0 (i.e., the target thread depth), and executes a position control for the spindle axis 12 with use of the prepared movement command. If the equation 1 is not satisfied, the judgment at step S6 is repeated until the equation 1 is satisfied. The spindle axis 12 performs, in accordance with the movement command from the spindle-axis control section 18 (the positioning-motion control section 40), the cutting motion from the point B toward the target thread depth, by performing the decelerated rotation at the optimum deceleration, and reaches and stops at the target thread depth when Sr becomes equal to zero. In this way, in time period T4 (FIG. 5) in which the spindle axis operates from the point B to reach the target thread depth, the spindle-axis control section 18 executes a position control for the spindle axis 12 (a velocity command obtained from the movement command is depicted by a broken line).

In the position control at step S7, the spindle-axis control section 18 (the positioning-motion control section 40) executes a position control routine depicted in FIG. 3. First, at step Q1, the first-velocity-command calculating section 42 calculates the first velocity command Cpv1 for the position control, the first velocity command making the spindle axis 12 perform the decelerated rotation at the aforementioned variable deceleration A1 during the acceleration-varying time t1 just after the spindle axis 12 reaches the intermediate speed Vb and just before the spindle axis 12 reaches the target thread depth (i.e., the target position), and making the spindle axis 12 perform the decelerated rotation at the maximum deceleration A0 during a time except for the acceleration-varying time t1. Then, at step Q2, the second-velocity-command calculating section 44 calculates the second velocity command Cpv2 for the position control, the second velocity command making the spindle axis 12 perform the decelerated rotation at the aforementioned constant deceleration Acons after the spindle axis 12 reaches the intermediate speed Vb.

Figure 7A:
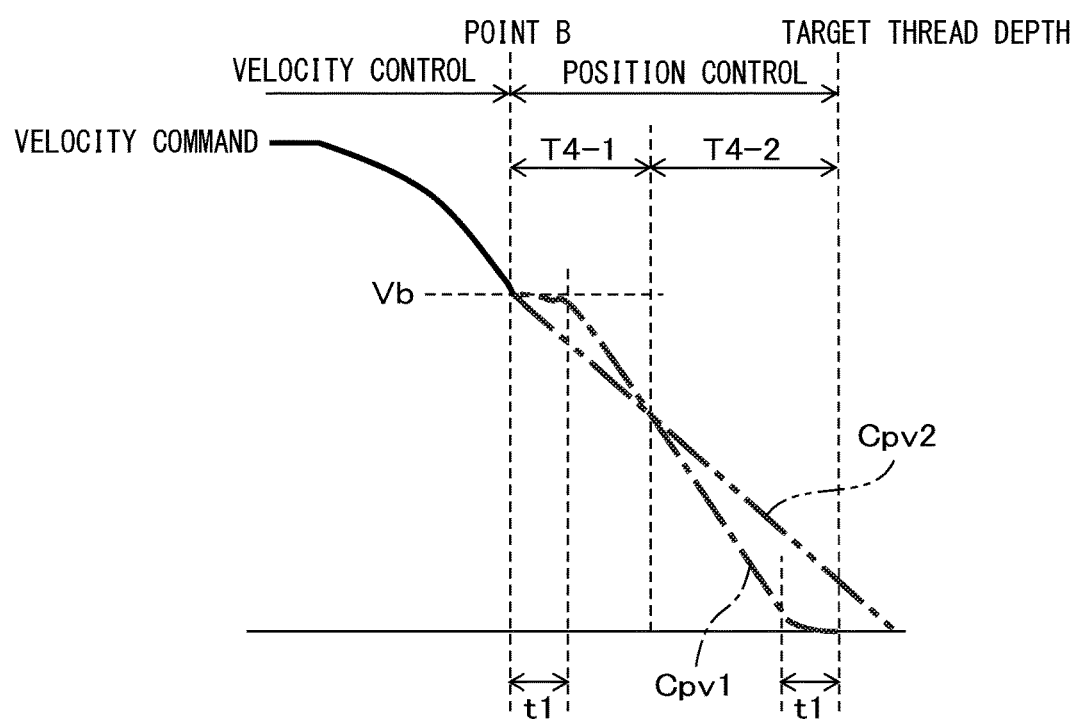
FIG. 7A is an illustration depicting two types of velocity commands in a position control executed in the embodiment of FIGS. 1-4.

FIG. 7A depicts exemplary velocity commands during the position control executed by the positioning-motion control section 40, i.e., a curve (a chain line) of the first velocity command Cpv1 and a curve (a chain double-dashed line) of the second velocity command Cpv2. As illustrated, the first-velocity-command calculating section 42 calculates, on the premise that the deceleration of the spindle axis 12 is in the condition of zero at the point B (or the intermediate speed Vb), the first velocity command Cpv1 for making the spindle axis 12 move at the variable deceleration A1 gradually increasing from zero to the maximum deceleration A0 as time passes in the acceleration-varying time t1 immediately after the point B, thereafter move at the maximum deceleration A0, then move at the variable deceleration A1 gradually decreasing from the maximum deceleration A0 to zero as time passes in the acceleration-varying time t1 immediately before the target thread depth, and finally stop at the target thread depth.

The value $\Delta Cpv1(n)$ of velocity command per unit time in the acceleration-varying time t1 (time constant $\tau$) is represented by the following equation 3:

$$\Delta Cpv1(n)=Vb-n(n+1)/2\times A0/\tau \quad \text{equation 3}$$

The second-velocity-command calculating section 44 calculates the second velocity command Cpv2 for making the spindle axis 12 decelerate at the constant deceleration Acons from the point B and finally stop at the target thread depth, in a time equal to a time required for the spindle axis 12 to move from the point B to the target thread depth according to the first velocity command Cpv1. The second velocity command Cpv2 is represented by the following equation 4:

$$Cpv2=Vb-A\text{cons}\times Tct1 \quad \text{equation 4}$$

As illustrated, the constant deceleration Acons achieved by the second velocity command Cpv2 may be set to be lower than a constant deceleration by which the spindle axis 12 reaches the target thread depth in a time equal to a time required in the case of the first velocity command Cpv1. When the constant deceleration by which the spindle axis 12 reaches the target thread depth in a time equal to a time required in the case of the first velocity command Cpv1 is represented as Acons(base), the constant deceleration Acons achieved by the second velocity command Cpv2 may be represented by the following equation 5:

$$A0/2 \leq A\text{cons} \leq A\text{cons(base)} \quad \text{equation 5}$$

In this manner, a magnitude of the constant deceleration Acons may be set to be higher than or equal to one-half of a magnitude of the maximum deceleration A0, and as an example, Acons=A0/2 may be adopted. If the constant deceleration Acons becomes lower than one-half of the maximum deceleration A0, later-mentioned effects in suppressing an acceleration change at the point B may be reduced. The constant deceleration Acons may be set by a system designer within the range represented by the equation 5 based on an experimental rule, and may be stored as one of control parameters in a memory (not depicted) of the controller 10.

Turning back to FIG. 3, at step Q3, the velocity-command choosing section 46 continuously compares the first velocity command Cpv1 and the second velocity command Cpv2, during a period when the spindle axis 12 operates from the intermediate speed Vb to reach the target position. If the first velocity command Cpv1 is lower than or equal to the second velocity command Cpv2, the velocity-command choosing section 46 chooses, at step Q4, the first velocity command Cpv1, and calculates and determines, at step Q5, a torque command based on the first velocity command Cpv1. If the first velocity command Cpv1 is higher than the second velocity command Cpv2 in the comparison at step Q3, the velocity-command choosing section 46 chooses, at step Q6, the second velocity command Cpv2, and calculates and determines, at step Q5, a torque command based on the second velocity command Cpv2. The positioning-motion control section 40 continuously instructs the torque command determined by the velocity-command choosing section 46 to the spindle axis 12.

After the torque command is determined, the positioning-motion control section 40 judges, at step Q8, whether or not the spindle axis 12 has reached the target position (or target thread depth) based on the sequentially detected residual rotation amount Sr. If the spindle axis 12 has reached the target thread depth, the position control routine is finished. If the spindle axis 12 has not reached the target thread depth, the control flow returns to step Q1 and the position control routine is repeated.

Figure 7B:
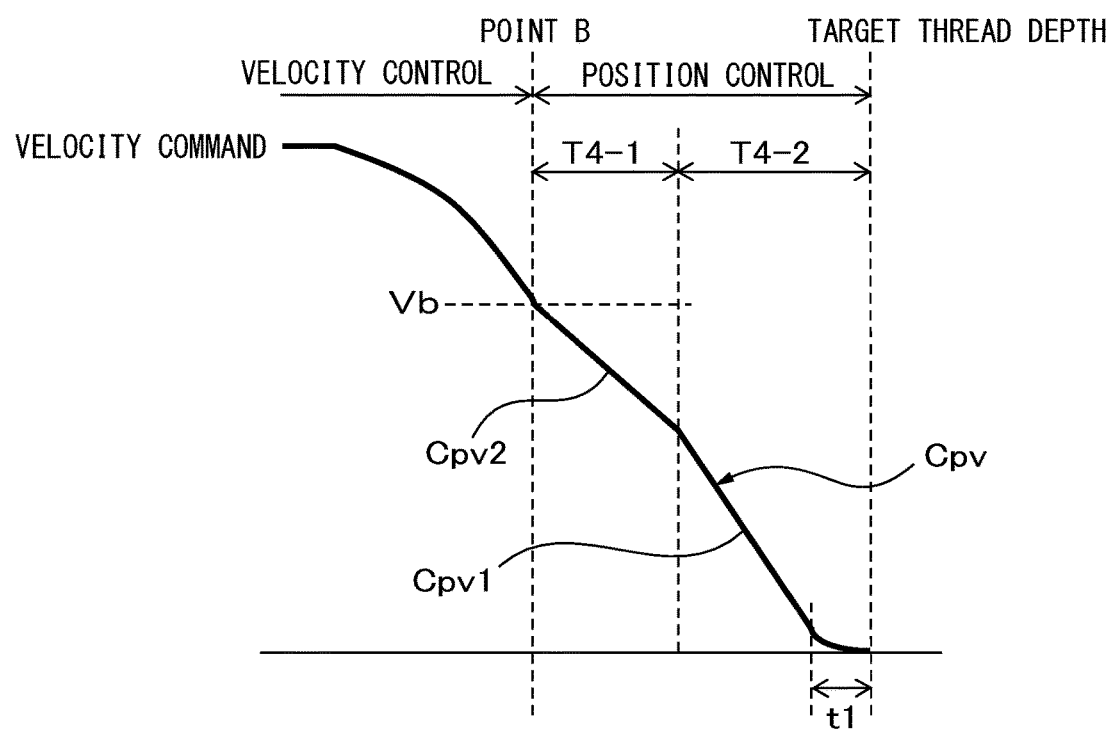
FIG. 7B is an illustration depicting a resultant velocity command in a position control executed in the embodiment of FIGS. 1-4.

FIG. 7B depicts an exemplary velocity command during the position control executed by the positioning-motion control section 40, i.e., a curve of a velocity command Cpv obtained through a choosing process (steps Q3, Q4 and Q5) executed by the velocity-command choosing section 46. As illustrated, the second velocity command Cpv2 is chosen in time period T4-1 immediately after the point B, during which the first velocity command Cpv1 is higher than the second velocity command Cpv2 (see FIG. 7A), and the spindle axis 12 performs the decelerated rotation at the constant deceleration Acons from the intermediate speed Vb and continues the cutting motion. In the time period T4-1, the spindle axis is not controlled by the first velocity command Cpv1 to move at the variable deceleration A1 in the acceleration-varying time t1 immediately after the point B. As a result, it is possible to suppress a change in the deceleration caused at the point B at which the velocity control is switched to the position control (see FIG. 7B).

Since the constant deceleration Acons achieved by the second velocity command Cpv2 is lower than the maximum deceleration A0, a magnitude relationship between the first velocity command Cpv1 and the second velocity command Cpv2 is reversed during the decelerated rotation at the constant deceleration Acons. Then, in time period T4-2, during which the first velocity command Cpv1 becomes lower than the second velocity command Cpv2 (see FIG. 7A), the first velocity command Cpv1 is chosen and the spindle axis 12 performs the decelerated rotation at the maximum deceleration A0 higher than or equal to the constant deceleration Acons, thereafter performs the decelerated rotation at the variable deceleration A1 over the acceleration-varying time t1 immediately before the target thread depth, and continues the cutting motion. In the time period T4-2, the spindle axis is controlled by the first velocity command Cpv1 to move at the variable deceleration A1 in the acceleration-varying time t1 immediately before the target thread depth. As a result, it is possible to suppress a shock caused when the spindle axis 12 is stopped or the motion of the spindle axis 12 is inverted from the cutting motion to the return motion, at the target thread depth (see FIG. 7B).

Figure 8A:
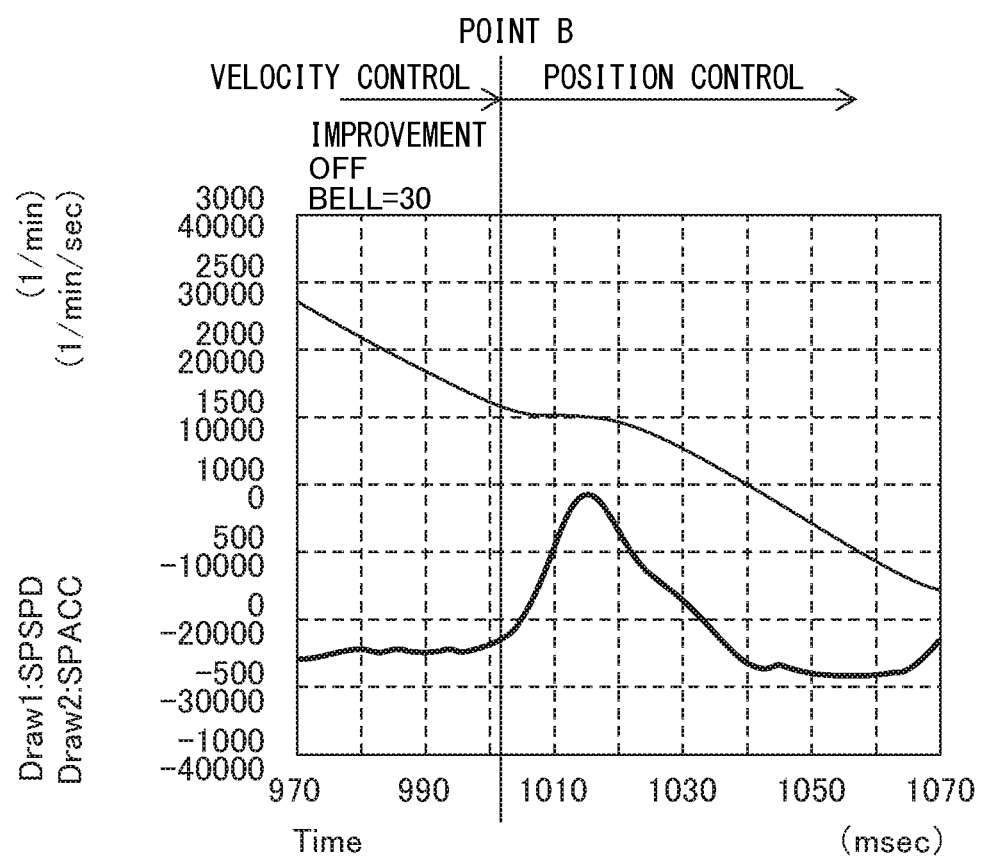
FIG. 8A is an enlarged illustration of a part of the motion of a spindle axis, depicted in FIG. 5 or FIG. 6, which is not subjected to a velocity-command choosing procedure.
Figure 8B:
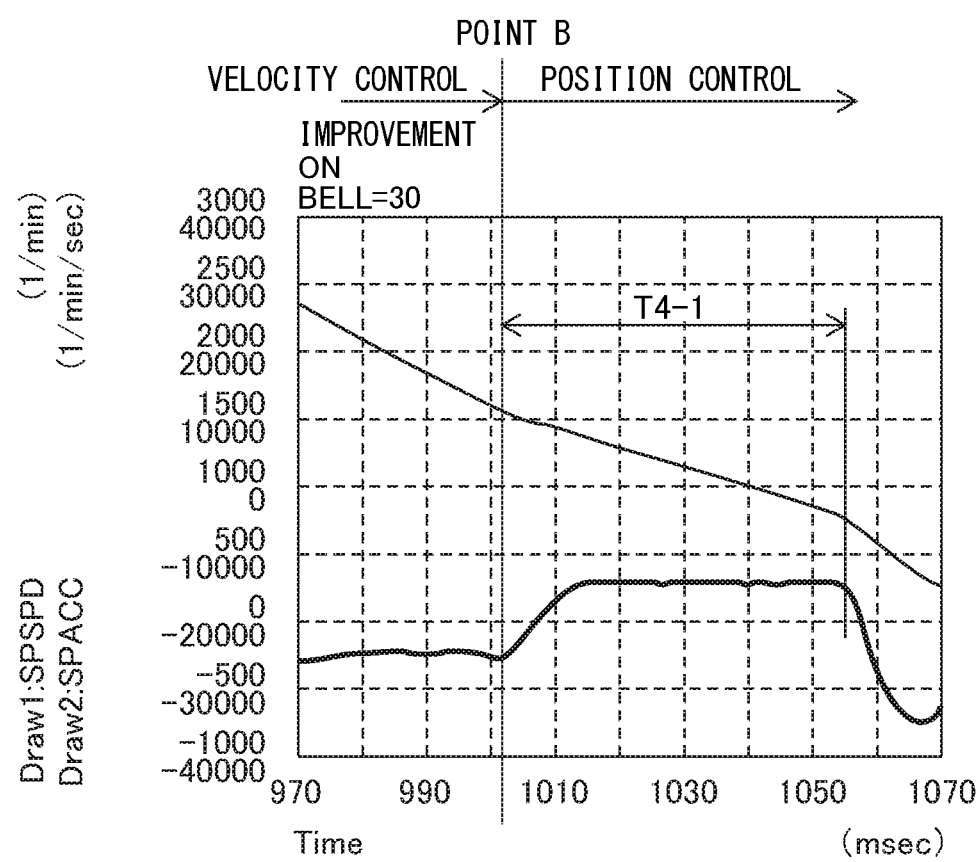
FIG. 8B is an enlarged illustration of a part of the motion of a spindle axis, depicted in FIG. 5 or FIG. 6, which has been subjected to a velocity-command choosing procedure.

FIGS. 8A and 8B illustrate in an enlarged manner an area around the point B in the speed-time curve of FIG. 5, and depict a speed-time curve (thin line) and speed-acceleration curve (thick line) during an arbitral time period according to one example. FIG. 8A depicts a configuration wherein the spindle axis 12 performs the decelerated rotation from the point B in accordance only with the first velocity command Cpv1, without the execution of steps Q2 to Q4 and Q6 in the aforementioned position control routine. On the other hand, FIG. 8B depicts a configuration wherein the spindle axis 12 performs the decelerated rotation from the point B in accordance with either one of the first velocity command Cpv1 and the second velocity command Cpv2, which achieves a lower speed, with the execution of the aforementioned position control routine (steps Q1 to Q7). In the example depicted in FIG. 8A, an approximately constant acceleration (or deceleration) of the spindle axis 12 during the velocity control significantly changes to peak immediately after the point B at which the velocity control is switched to the position control.

On the other hand, in the example depicted in FIG. 8B, as a result of the execution of choosing the velocity command after the point B in a manner as described above, the spindle axis 12 decelerates at the constant deceleration Acons during the time period T4-1 immediately after the point B. Accordingly, the spindle axis 12 performs a relatively smooth decelerated rotation, with a change in acceleration before and after the point B being suppressed. Consequently, a mechanical or structural shock that may be caused on the spindle axis 12 due to the change in acceleration is reduced, and a synchronization error that may be caused between the spindle axis 12 and the feed axis 14 due to the change in acceleration is reduced.

Turning back to FIG. 2, if the spindle-axis control section 18 (the current-speed detecting section 36) judges, at step S3, that the current speed Vc has reached the maximum rotation speed V0, the spindle-axis control section 18 stores, at step S8, a rotation amount (i.e., a rotational position FBS) of the spindle axis 12 from the process start position at an instant when the spindle axis reaches the maximum rotation speed V0, as an acceleration rotation amount Sa. Then, at step S9, the spindle-axis control section 18 judges whether the residual rotation amount Sr is equal to or less than the acceleration rotation amount Sa. If "Sr" is equal to or less than "Sa", the control flow goes to step S5, and subsequently executes steps S6 and S7, so as to perform the cutting motion until the target thread depth. If "Sr" is not equal to or not less than "Sa", the judgment at step S9 is repeated until "Sr" becomes equal to or less than "Sa".

Referring now to FIG. 6, one example of the cutting motion of the spindle axis 12, in the case where the current speed Vc reaches the maximum rotation speed V0 before the residual rotation amount Sr reaches one-half of the total rotation amount S0 (i.e., in the case where the judgment result at step S3 is No), is depicted by a speed-time curve (the curve above a time axis). As depicted in FIG. 6, the accelerated rotation of the spindle axis 12 at maximum capacity at step S2 is performed during time periods T1 and T2, and the maximum acceleration A0 is detected during the constant acceleration in the time period T1 (i.e., a time period from a point when the spindle axis starts at the process start position to a point when the spindle axis reaches the intermediate speed Vb). When the rotational speed of the spindle axis 12 exceeds the intermediate speed Vb (the base speed of the spindle motor, in this example), the acceleration of the spindle axis 12 gradually decreases from the maximum acceleration A0 due to the characteristics of the spindle motor. The current speed Vc of the spindle axis 12 reaches the maximum rotation speed V0 before the residual rotation amount Sr reaches one-half of the total rotation amount S0. Thereafter, the spindle axis 12 rotates at the constant speed V0 (i.e., null acceleration) over time period T5 so as to continue the cutting motion. At a time point A when the residual rotation amount Sr becomes equal to the acceleration rotation amount Sa (i.e., when the judgment result at step S9 becomes YES), the motion of the spindle axis 12 changes from the accelerated rotation to the decelerated rotation. Then, in time period T3 (step S5), the spindle axis 12 performs the aforementioned decelerated rotation while gradually increasing the deceleration Ac (by the velocity control), and in time period T4 (step S7), the spindle axis 12 performs the decelerated rotation at the optimum deceleration in accordance with the position control routine depicted in FIG. 3. The spindle axis 12 reaches and stops at the target thread depth when "Sr" becomes equal to zero. In the time periods T1, T2, T3 and T4, the spindle axis 12 operates in the same manner as the motion depicted in FIG. 5.

In the motion examples depicted in FIGS. 5 and 6, during a period when the spindle-axis control section 18 controls the rotational (or cutting) motion of the spindle axis 12 from the process start position to the target thread depth, the feed-axis control section 22 (FIG. 1) executes a feedback control for the feed axis 14 so as to make the feed axis perform a feed motion while following the motion of the spindle axis 12, with use of the rotational position FBS of the spindle axis 12. During a period when the spindle-axis control section 18 executes the processes from step S1 to step S9, the numerical control section 16 monitors the residual rotation amount Sr notified from the spindle-axis control section 18, and judges that the tapping process has reached the target thread depth when the residual rotation amount Sr becomes equal to or less than a first predetermined value (a very small value close to zero).

As described above, the controller 10 has a configuration wherein, when the spindle axis 12 performs the cutting motion (rotational motion) from the process start position (starting position) to the target thread depth (target position), the numerical control section 16 instructs only the total rotation amount S0 and the maximum rotation speed V0, of the spindle axis 12, as the spindle axis command CS to the spindle-axis control section 18, and the spindle-axis control section 18 performs, in accordance with the spindle axis command CS, the cutting motion by accelerating the spindle axis 12 with the maximum power using the maximum permissible current, aiming at the maximum rotation speed V0, and continuously performs, based on the maximum acceleration A0 detected during the maximum accelerated rotation as well as the sequentially detected residual rotation amount Sr and current speed Vc of the spindle axis 12, the cutting motion until the target thread depth while decelerating the spindle axis 12 at the optimum deceleration so as to make the spindle axis reach the target thread depth. Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 is configured so that, during the decelerated rotation of the spindle axis 12, the decelerating-motion control section 38 executes the velocity control for the spindle axis 12 by the successively updated velocity command Cv, so as to suppress a change in the deceleration just before the point B at which the velocity control is switched to the position control, and the velocity-command choosing section 46 of the positioning-motion control section 40 chooses either one, achieving the lower speed, of the first velocity command Cpv1 for the bell-shaped deceleration, calculated by the first-velocity-command calculating section 42, and the second velocity command Cpv2 for the constant deceleration, calculated by the second-velocity-command calculating section 44, during the position control executed between the point B and the target thread depth, so as to suppress both of a change in the deceleration caused when the control is switched at the point B and a shock caused when the spindle axis is stopped or the motion of the spindle axis is inverted at the target thread depth. Consequently, according to the controller 10, it is possible to reduce a mechanical or structural shock that may be caused on the spindle axis 12 due to the change in acceleration, and to reduce a synchronization error that may be caused between the spindle axis 12 and the feed axis 14 due to the change in acceleration, during the decelerated rotation of the spindle axis 12.

The controller 10 depicted in FIG. 1 is capable of executing, in relation to the aforementioned return motion of the spindle axis 12, a control strategy analogous to the aforementioned control strategy for the cutting motion from the process start position to the target thread depth. FIGS. 5 and 6 depict one example of the return motion of the spindle axis 12, corresponding to the aforementioned cutting motion of the spindle axis 12, by a speed-time curve (the curve below a time axis), in addition to the cutting motion. With reference to a flow chart illustrated in FIG. 4 together with FIGS. 1, 3 5 and 6, a method of controlling the return motion of the spindle axis 12, executed by the controller 10, will be described below. Note that, for a better understanding, a reference numeral or symbol used in the following explanation is provided with a prime (') that is added to a corresponding reference numeral or symbol used in the explanation of the cutting motion control method.

After it is judged that the tapping process has reached the target thread depth in the cutting motion control flow of FIG. 2, the numerical control section 16 (the spindle-axis command outputting section 26) obtains, at step S10, a total return-rotation amount S0' and a maximum return-rotation speed V0', of the spindle axis 12, during a period when the spindle axis operates from the target thread depth (or starting position) to the return completion position (or target position), from a command value provided in the tapping program P interpreted by the program interpreting section 24, and sends the total return-rotation amount S0' and the maximum return-rotation speed V0' as a spindle-axis command CS to the spindle-axis control section 18. The spindle-axis command CS for the return motion also does not include a position command (or movement command) and/or an acceleration/deceleration command, which makes the spindle axis 12 perform a rotational motion until the return completion position. Note that the return completion position may be the same as the process start position, or may be different from the process start position. In the case where the return completion position coincides with the process start position, the total return-rotation amount S0' is equal to the total rotation amount S0 in the cutting motion, but the maximum return-rotation speed V0' is not always equal to the maximum rotation speed V0 in the cutting motion. Also, if the total return-rotation amount S0' and the maximum return-rotation speed V0' are equal to the total rotation amount S0 and the maximum rotation speed V0 in the cutting motion, the return motion is depicted by the substantially same speed-time curve as that of the cutting motion, but if the total return-rotation amount S0' and the maximum return-rotation speed V0' are different from the total rotation amount S0 and the maximum rotation speed V0 in the cutting motion, the return motion is not always depicted by the same speed-time curve as that of the cutting motion.

Next, at step S11, the spindle-axis control section 18 (the initial-motion control section 30, the maximum-acceleration detecting section 32 and the residual rotation-amount detecting section 34) executes the following processes. The initial-motion control section 30 makes the spindle axis 12 perform an accelerated inverse rotation at maximum capacity using the maximum permissible current of the drive source from the target thread depth (i.e., zero speed), by a velocity control in which the maximum return-rotation speed V0' is set as a target value, so as to perform the return motion. The maximum-acceleration detecting section 32 detects a maximum acceleration A0' of inverse rotation of the spindle axis 12, during the accelerated inverse rotation at maximum capacity from the target thread depth, based on the rotational position FBS. The residual rotation-amount detecting section 34 sequentially detects a residual return-rotation amount Sr' of the spindle axis 12 from a current position during the accelerated inverse rotation, based on the total return-rotation amount S0' and the rotational position FBS. The spindle-axis control section 18 notifies the detected residual return-rotation amount Sr' to the numerical control section 16 every time it is detected.

Next, at step S12, the spindle-axis control section 18 (the current-speed detecting section 36) sequentially detects a current speed Vc' of inverse rotation of the spindle axis 12, based on the rotational position FBS during the accelerated inverse rotation at maximum capacity, and judges whether the current speed Vc' has not reached the maximum return-rotation speed V0' every time it is detected. If "Vc'" has not reached "V0'", the spindle-axis control section 18 (the decelerating-motion control section 38) judges, at step S13, whether the residual return-rotation amount Sr' is equal to or less than one-half of the total return-rotation amount S0'. If "Sr'" is equal to or less than one-half of "S0'", the spindle-axis control section 18 (the decelerating-motion control section 38) makes, at step S14, the spindle axis 12 perform a decelerated inverse rotation until the intermediate return-speed Vb', so as to continuously perform the return motion. If "Sr'" is not equal to or not less than one-half of "S0'", the control flow returns to step S12.

Referring now to FIG. 5, one example of the return motion of the spindle axis 12, in the case where the residual return-rotation amount Sr' reaches one-half of the total return-rotation amount S0' before the current speed Vc' of inverse rotation reaches the maximum return-rotation speed V0' (i.e., in the case where the judgment results at respective steps S12 and S13 are YES), is depicted by a speed-time curve (the curve below a time axis). The accelerated inverse rotation at maximum capacity of the spindle axis 12 at step S11 is performed during time periods T6 and T7 depicted in FIG. 5, and the maximum acceleration A0' of inverse rotation is detected during the constant acceleration in the time period T6 (i.e., a time period from a point when the spindle axis starts at the target thread depth to a point when the spindle axis reaches the intermediate return-speed Vb'). When the rotational speed of the spindle axis 12 exceeds the intermediate return-speed Vb' (the base speed of the spindle motor, in this example), the acceleration of the spindle axis 12 gradually decreases from the maximum acceleration A0' due to the characteristics of the spindle motor. At a time point C when the residual return-rotation amount Sr' reaches one-half of the total return-rotation amount S0' (i.e., when the rotation amount from the start of returning reaches one-half of the total return-rotation amount S0') (or when the judgment result at step S13 becomes YES), the motion of the spindle axis 12 changes from the accelerated inverse rotation to the decelerated inverse rotation, and in time period T8, the spindle axis 12 performs the decelerated inverse rotation at step S14. In the time periods T6, T7 and T8, the spindle-axis control section 18 executes a velocity control for the spindle axis 12 (a velocity command in these time periods is illustrated by a broken line).

During the time period T8 (step S14), the spindle-axis control section 18 (the residual rotation-amount detecting section 34 and the current-speed detecting section 36) also sequentially detects the residual return-rotation amount Sr' from the current position and the current speed Vc' of inverse rotation, of the spindle axis 12. In the time period T8 (step S14), the spindle-axis control section 18 (the decelerating-motion control section 38) executes the velocity control to make the spindle axis 12 perform the decelerated inverse rotation from the point C (or a maximum speed of inverse rotation) until the intermediate return-speed Vb', and in the meantime, successively updates a velocity command Cv' for the decelerated inverse rotation with use of the residual return-rotation amount Sr' and the current speed Vc' of inverse rotation (velocity command Cv' is illustrated by a broken line in FIG. 5). More specifically, the decelerating-motion control section 38 successively updates the velocity command Cv' and makes the spindle axis 12 perform the decelerated inverse rotation by the successively updated velocity command Cv', so that the residual return-rotation amount Sr' of the spindle axis 12 at an instant when the spindle axis 12 reaches the predetermined intermediate return-speed Vb' becomes equal to a positioning return-rotation amount Spos' of the spindle axis 12 required for the spindle axis to stop at the return completion position under the position control executed by the positioning-motion control section 40.

The positioning return-rotation amount Spos' corresponds to a position of a time point D (FIG. 5), at which it is expected that the residual return-rotation amount Sr' becomes equal to zero and the current speed Vc' of inverse rotation becomes equal to zero (i.e., the spindle axis reaches the return completion position) when the positioning-motion control section 40 decelerates, while taking into account the aforementioned acceleration-varying time t1 (sec), the spindle axis 12 from the current speed Vc' of inverse rotation (hereinafter described as a rotation number per second (unit thereof being represented as rev/sec)) at the maximum deceleration A0' of inverse rotation (negative value) corresponding to the maximum acceleration A0' of inverse rotation (rev/sec$^2$) detected at step S11. The positioning return-rotation amount Spos' is determined, analogously to the aforementioned positioning rotation amount Spos, by the following equation 6:

$$Spos' = Vb'^2/(2\times|A0'|) + Vb' \times \tau/2 = |Sr'| \qquad \text{equation 6}$$

If the residual return-rotation amount Sr' at an instant when the spindle axis 12 reaches the intermediate return-speed Vb' is equal to the positioning return-rotation amount Spos' of the spindle axis 12, the correspondence between the residual return-rotation amount (i.e., the current position) Sr', the current speed Vc' (rev/sec) and the current deceleration Ac' (rev/sec$^2$), of the spindle axis 12 during the time period T8, is represented by the following equation:

$$|Ac'| = (Vc'^2 - Vb'^2)/(2\times(Sr' - Spos'))$$

based on a formula:

$$Vc'^2 - Vb'^2 = 2\times|Ac'|\times(Sr' - Spos')$$

In the time period T8 (step S14), the spindle-axis control section 18 (the decelerating-motion control section 38) constantly monitors the residual return-rotation amount Sr' and the current speed Vc' of inverse rotation of the spindle axis 12, and determines a new or updated velocity command Cv' by subtracting a value obtained by multiplying the aforementioned current deceleration Ac' by a velocity-command updating cycle Tct1 (sec) from the current speed Vc' (i.e., the last velocity command Cv'). The velocity command Cv' is represented by the following equation 7:

$$Cv' = Vc' - Ac' \times Tct1 \qquad \text{equation 7}$$

According to the equation 7, the decelerating-motion control section 38 successively updates the velocity command Cv' in the velocity-command updating cycle Tct1. The spindle axis 12 performs the decelerated inverse rotation while gradually increasing the deceleration Ac' in accordance with the successively updated velocity command Cv', during the operation from the point C to the point D, and reaches the point D at an instant when being decelerated to the intermediate return-speed Vb' (FIG. 5).

Turning back to FIG. 4, at step S15, the spindle-axis control section 18 (the positioning-motion control section 40) judges whether the absolute value |Sr'| of the residual return-rotation amount Sr' of the spindle axis 12 satisfies the equation 6: $|Sr'| = Vb'^2/(2\times|A0'|) + Vb' \times \tau/2$ (i.e., whether or not the rotational position of the spindle axis 12 has reached the point D). If the equation 6 is satisfied, the spindle-axis control section 18 (the positioning-motion control section 40) prepares, at step S16, a movement command for making the spindle axis 12 perform the decelerated inverse rotation at the optimum deceleration and stop at the point of Sr'=0 (i.e., the return completion position), and executes a position control for the spindle axis 12 with use of the prepared movement command. If the equation 6 is not satisfied, the judgment at step S15 is repeated until the equation 6 is satisfied. The spindle axis 12 performs, in accordance with the movement command from the spindle-axis control section 18 (the positioning-motion control section 40), the return motion from the point D toward the return completion position, by performing the decelerated inverse rotation at the optimum deceleration, and reaches and stops at the return completion position when Sr' becomes equal to zero.

In this way, in time period T9 (FIG. 5) in which the spindle axis operates from the point D to reach the return completion position, the spindle-axis control section 18 executes a position control for the spindle axis 12 (a velocity command obtained from the movement command is depicted by a broken line).

In the position control at step S16, the spindle-axis control section 18 (the positioning-motion control section 40) executes a position control routine depicted in FIG. 3, in a manner analogous to the aforementioned position control at step S7. In summary, at steps Q1 and Q2, the first-velocity-command calculating section 42 calculates the first velocity command Cpv1 and the second-velocity-command calculating section 44 calculates the second velocity command Cpv2. Next, at steps Q3 to Q6, the velocity-command choosing section 46 of the positioning-motion control section 40 compares the first velocity command Cpv1 and the second velocity command Cpv2, chooses either one, achieving the lower speed, of the first and second velocity commands, and calculates and determines a torque command based on the chosen one of the first and second velocity commands Cpv1, Cpv2. Next, the positioning-motion control section 40 judges, at step Q7, whether or not the spindle axis 12 has reached the target position (or return completion position) based on the sequentially detected residual return-rotation amount Sr'. If the spindle axis 12 has reached the return completion position, the position control routine is finished. If the spindle axis 12 has not reached the return completion position, the control flow returns to step Q1 and the position control routine is repeated. According to the execution of the above position control routine, it is possible, in the return motion, to suppress a change in the deceleration caused at the point D at which the velocity control is switched to the position control and a shock caused when the spindle axis 12 is stopped at the return completion position, which is an effect analogous to that in the cutting motion explained with reference to FIGS. 7A and 7B.

Turning back to FIG. 4, if the spindle-axis control section 18 (the current-speed detecting section 36) judges, at step S12, that the current speed Vc' of inverse rotation has reached the maximum return-rotation speed V0', the spindle-axis control section 18 stores, at step S17, a rotation amount (i.e., a rotational position FBS) of the spindle axis 12 from the target thread depth at an instant when the spindle axis reaches the maximum return-rotation speed V0', as an acceleration rotation amount Sa' of the return motion. Then, at step S18, the spindle-axis control section 18 judges whether the residual return-rotation amount Sr' is equal to or less than the acceleration rotation amount Sa'. If "Sr'" is equal to or less than "Sa'", the control flow goes to step S14, and subsequently executes steps S15 and S16, so as to perform the return motion until the return completion position. If "Sr'" is not equal to or not less than "Sa'", the judgment at step S18 is repeated until "Sr'" becomes equal to or less than "Sa'".

Referring now to FIG. 6, one example of the return motion of the spindle axis 12, in the case where the current speed Vc' of inverse rotation reaches the maximum return-rotation speed V0' before the residual return-rotation amount Sr' reaches one-half of the total return-rotation amount S0' (i.e., in the case where the judgment result at step S12 is No), is depicted by a speed-time curve (the curve below a time axis). As depicted in FIG. 6, the accelerated inverse rotation of the spindle axis 12 at maximum capacity at step S11 is performed during time periods T6 and T7, and the maximum acceleration A0' of inverse rotation is detected during a constant acceleration in time period T6 (i.e., a time period from a point when the spindle axis starts at the target thread depth to a point when the spindle axis reaches the intermediate return-speed Vb'). When the rotational speed of the spindle axis 12 exceeds the intermediate return-speed Vb' (the base speed of the spindle motor, in this example), the acceleration of the spindle axis 12 gradually decreases from the maximum acceleration A0' due to the characteristics of the spindle motor. The current speed Vc' of the spindle axis 12 reaches the maximum return-rotation speed V0' before the residual return-rotation amount Sr' reaches one-half of the total return-rotation amount S0', and thereafter, the spindle axis 12 inversely rotates at the constant speed V0' (i.e., null acceleration) over time period T10 so as to continue the return motion. At a time point C when the residual return-rotation amount Sr' becomes equal to the acceleration rotation amount Sa' (i.e., when the judgment result at step S18 becomes YES), the motion of the spindle axis 12 changes from the accelerated inverse rotation to the decelerated inverse rotation. Then, in time period T8 (step S14), the spindle axis 12 performs the aforementioned decelerated inverse rotation while gradually increasing the deceleration Ac' (by the velocity control), and in time period T9 (step S16), the spindle axis 12 performs the decelerated inverse rotation at the optimum deceleration in accordance with the position control routine depicted in FIG. 3. The spindle axis 12 reaches and stops at the return completion position when "Sr'" becomes equal to zero. In the time periods T6, T7, T8 and T9, the spindle axis 12 operates in the same manner as the motion depicted in FIG. 5.

In the motion examples depicted in FIGS. 5 and 6, during a period when the spindle-axis control section 18 controls the inverse rotational (or return) motion of the spindle axis 12 from the target thread depth to the return completion position, the feed-axis control section 22 (FIG. 1) executes a feedback control for the feed axis 14 so as to make the feed axis perform an inverse feed motion while following the motion of the spindle axis 12, with use of the rotational position FBS of the spindle axis 12. During a period when the spindle-axis control section 18 executes the processes from step S10 to step S18, the numerical control section 16 monitors the residual return-rotation amount Sr' notified from the spindle-axis control section 18, and judges that the return motion is completed and the tool has been pulled out from the workpiece when the residual return-rotation amount Sr' becomes equal to or less than a second predetermined value (a very small value close to zero).

As described above, the controller 10 has a configuration wherein, when the spindle axis 12 performs the return motion (rotational motion) from the target thread depth (starting position) to the return completion position (target position), the numerical control section 16 instructs only the total return-rotation amount S0' and the maximum return-rotation speed V0', of the spindle axis 12, as the spindle axis command CS to the spindle-axis control section 18, and the spindle-axis control section 18 performs, in accordance with the spindle axis command CS, the return motion by inversely accelerating the spindle axis 12 with the maximum power using the maximum permissible current, aiming at the maximum return-rotation speed V0', and continuously performs, based on the maximum acceleration A0' detected during the maximum accelerated rotation as well as the sequentially detected residual return-rotation amount Sr' and current speed Vc' of the spindle axis 12, the return motion until the return completion position while inversely decelerating the spindle axis 12 at the optimum deceleration so as to make the spindle axis reach the return complete position.

Therefore, according to the controller 10, it is no longer necessary to perform a parameter setting or adjustment, etc., required for the numerical control section 16 to prepare acceleration and deceleration commands in conformity with the power characteristics of the spindle axis 12, and it is possible, with a simple configuration, to reduce the cycle time of the tapping process by executing an acceleration and deceleration control so as to maximize the acceleration capacity of the spindle axis 12.

Further, the controller 10 is configured so that, during the decelerated inverse rotation of the spindle axis 12, the decelerating-motion control section 38 executes the velocity control for the spindle axis 12 by the successively updated velocity command Cv', so as to suppress a change in the deceleration just before the point D at which the velocity control is switched to the position control, and the velocity-command choosing section 46 of the positioning-motion control section 40 chooses either one, achieving the lower speed, of the first velocity command Cpv1 for the bell-shaped deceleration, calculated by the first-velocity-command calculating section 42, and the second velocity command Cpv2 for the constant deceleration, calculated by the second-velocity-command calculating section 44, during the position control executed between the point D and the return completion position, so as to suppress both of a change in the deceleration caused when the control is switched at the point D and a shock caused when the spindle axis is stopped at the return completion position. Consequently, according to the controller 10, it is possible to reduce a mechanical or structural shock that may be caused on the spindle axis 12 due to the change in acceleration, and to reduce a synchronization error that may be caused between the spindle axis 12 and the feed axis 14 due to the change in acceleration, during the decelerated inverse rotation of the spindle axis 12.

The above-described configuration of the controller 10 can be described as a machine tool control method for controlling a synchronized operation of the spindle axis 12 and the feed axis 14. The control method includes the steps, executed by the controller 10, of:

- obtaining, from a tapping program P, a total rotation amount S0 (or a total return-rotation amount S0') and a maximum rotation speed V0 (or a maximum return-rotation speed V0') of the spindle axis 12 during a period when the spindle axis operates from a starting position to a target position;
- making the spindle axis 12 perform an accelerated rotation (or an accelerated inverse rotation) at maximum capacity using a maximum permissible current of a drive source from the starting position, by a velocity control in which the maximum rotation speed V0 (or the maximum return-rotation speed V0') is set as a target value;
- detecting a maximum acceleration A0 (or a maximum acceleration A0' of inverse rotation) of the spindle axis 12 during the accelerated rotation (or the accelerated inverse rotation) at maximum capacity, based on a rotational position feedback FBS of the spindle axis 12;
- detecting a residual rotation amount Sr (or a residual return-rotation amount Sr') of the spindle axis 12 during a period when the spindle axis operates from a current position to the target position, based on the total rotation amount S0 (or the total return-rotation amount S0') and the rotational position feedback FBS;
- detecting a current speed Vc (or a current speed Vc' of inverse rotation) of the spindle axis 12 based on the rotational position feedback FBS;
- executing a velocity control for making the spindle axis 12 perform a decelerated rotation (or a decelerated inverse rotation) so as to reach a predetermined intermediate speed Vb (or a predetermined intermediate return-speed Vb'), based on the residual rotation amount Sr (or the residual return-rotation amount Sr') and the current speed Vc (or the current speed Vc' of inverse rotation), after the accelerated rotation (or the accelerated inverse rotation) at maximum capacity; and
- executing a position control for making the spindle axis 12 perform a decelerated rotation (or a decelerated inverse rotation) so as to reach the target position, based on the maximum acceleration A0 (or the maximum acceleration A0' of inverse rotation), the residual rotation amount Sr (or the residual return-rotation amount Sr') and the current speed Vc (or the current speed Vc' of inverse rotation), after the spindle axis 12 reaches the intermediate speed Vb (or the intermediate return-speed Vb'), wherein the step to reach the predetermined intermediate speed includes successively updating a velocity command Cv (or a velocity command Cv') for the velocity control with use of the residual rotation amount Sr (or the residual return-rotation amount Sr') and the current speed Vc (or the current speed Vc' of inverse rotation), and making the spindle axis 12 perform the decelerated rotation (or the decelerated inverse rotation) by the successively updated velocity command Cv (or the successively updated velocity command Cv') so that the residual rotation amount Sr (or the residual return-rotation amount Sr') at an instant when the spindle axis 12 reaches the intermediate speed Vb (or the intermediate return-speed Vb') becomes equal to a positioning rotation amount Spos (or a positioning return-rotation amount Spos') of the spindle axis 12 required for the spindle axis to reach the target position under the position control, and wherein the step to reach the target position includes:

- calculating a first velocity command Cpv1 for the position control, the first velocity command making the spindle axis 12 perform the decelerated rotation (or the decelerated inverse rotation) at a maximum deceleration A0 (or a maximum deceleration A0' of inverse rotation) corresponding to the maximum acceleration A0 (or the maximum acceleration A0' of inverse rotation), during a time except for a predetermined acceleration-varying time t1 just after the spindle axis 12 reaches the intermediate speed Vb (or the intermediate return-speed Vb') or just before the spindle axis 12 reaches the target position, and making the spindle axis 12 perform the decelerated rotation (or the decelerated inverse rotation) at a variable deceleration A1 lower than the maximum deceleration A0 (or the maximum deceleration A0' of inverse rotation) and varying at a predetermined rate, during the acceleration-varying time t1;
- calculating a second velocity command Cpv2 for the position control, the second velocity command making the spindle axis 12 perform the decelerated rotation (or the decelerated inverse rotation) at a constant deceleration Acons lower than the maximum deceleration A0 (or the maximum deceleration A0' of inverse rotation) after the spindle axis 12 reaches the intermediate speed Vb (or the intermediate return-speed Vb'); and
- choosing a velocity command achieving a lower speed, which is either one of the first velocity command Cpv1 and the second velocity command Cpv2, during a period when the spindle axis 12 operates from the intermediate speed Vb (or the intermediate return-speed Vb') to reach the target position.

According to the above control methods, effects corresponding to those achieved by the aforementioned controller 10 can be obtained.

While the invention has been described with reference to specific embodiments, it will be understood, by those skilled in the art, that various changes or modifications may be made thereto without departing from the scope of the following claims.

The invention claimed is:

1. A controller of a machine tool, configured to control a synchronized operation of a spindle axis and a feed axis, the controller comprising:
   a numerical control section configured to prepare a spindle-axis command and a feed-axis command based on a tapping program;
   a spindle-axis control section configured to control a rotational motion of the spindle axis in accordance with the spindle-axis command;
   a rotation detecting section configured to detect a rotational position of the spindle axis; and
   a feed-axis control section configured to control a feed motion of the feed axis in accordance with the feed-axis command and based on the rotational position;
   the numerical control section comprising:
   a spindle-axis command outputting section configured to obtain, from the tapping program, a total rotation amount and a maximum rotation speed of the spindle axis during a period when the spindle axis operates from a starting position to a target position, and to send the total rotation amount and the maximum rotation speed as the spindle-axis command to the spindle-axis control section;
   the spindle-axis control section comprising:
   an initial-motion control section configured to make the spindle axis perform an accelerated rotation at a maximum capacity using a maximum permissible current of a drive source from the starting position, by a velocity control in which the maximum rotation speed is set as a target value;
   a maximum-acceleration detecting section configured to detect a maximum acceleration of the spindle axis during the accelerated rotation at the maximum capacity, based on the rotational position;
   a residual rotation-amount detecting section configured to detect a residual rotation amount of the spindle axis during a period when the spindle axis operates from a current position to the target position, based on the total rotation amount and the rotational position;
   a current-speed detecting section configured to detect a current speed of the spindle axis based on the rotational position;
   a decelerating-motion control section configured to execute the velocity control for making the spindle axis perform a decelerated rotation so as to reach a predetermined intermediate speed, based on the residual rotation amount and the current speed, after the accelerated rotation is performed at the maximum capacity; and
   a positioning-motion control section configured to execute a position control for making the spindle axis perform the decelerated rotation so as to reach the target position at a maximum deceleration corresponding to the maximum acceleration, the residual rotation amount and the current speed, after the spindle axis reaches the intermediate speed,
   wherein the decelerating-motion control section is configured to successively update a velocity command for the velocity control with use of the residual rotation amount and the current speed, and to make the spindle axis perform the decelerated rotation by the successively updated velocity command so that the residual rotation amount at an instant when the spindle axis reaches the intermediate speed becomes equal to a positioning rotation amount of the spindle axis required for the spindle axis to reach the target position under the position control, and
   wherein the positioning-motion control section includes:
   a first-velocity-command calculating section configured to calculate a first velocity command for the position control, the first velocity command making the spindle axis perform the decelerated rotation at the maximum deceleration corresponding to the maximum acceleration, during a time except for a predetermined acceleration-varying time just after the spindle axis reaches the intermediate speed and just before the spindle axis reaches the target position, and making the spindle axis perform the decelerated rotation at a variable deceleration lower than the maximum deceleration and varying at a predetermined rate, during the acceleration-varying time;
   a second-velocity-command calculating section configured to calculate a second velocity command for the position control, the second velocity command making the spindle axis perform the decelerated rotation at a constant deceleration lower than the maximum deceleration after the spindle axis reaches the intermediate speed; and
   a velocity-command choosing section configured to choose a velocity command achieving a lower speed, which is either one of the first velocity command and the second velocity command, during a period when the spindle axis operates from the intermediate speed to reach the target position.

2. The controller of claim 1, wherein a magnitude of the constant deceleration is higher than or equal to one-half of a magnitude of the maximum deceleration.

3. The controller of claim 1, wherein the starting position corresponds to a process start position of a tapping process, and wherein the target position corresponds to a target thread depth of the tapping process.

4. The controller of claim 1, wherein the starting position corresponds to a target thread depth of a tapping process, and wherein the target position corresponds to a return completion position of the tapping process.

5. A method of controlling a machine tool, configured to control a synchronized operation of a spindle axis and a feed axis, the method comprising the steps, executed by a controller, of:
   obtaining, from a tapping program, a total rotation amount and a maximum rotation speed of the spindle axis during a period when the spindle axis operates from a starting position to a target position;
   making the spindle axis perform an accelerated rotation at maximum capacity using a maximum permissible current of a drive source from the starting position, by a velocity, control in which the maximum rotation speed is set as a target value;
   detecting a maximum acceleration of the spindle axis during the accelerated rotation at the maximum capacity, based on a rotational position feedback of the spindle axis;

detecting a residual rotation amount of the spindle axis during a period when the spindle axis operates from a current position to the target position, based on the total rotation amount and the rotational position feedback;

detecting a current speed of the spindle axis based on the rotational position feedback;

executing the velocity control for making the spindle axis perform a decelerated rotation so as to reach a predetermined intermediate speed, based on the residual rotation amount and the current speed, after the accelerated rotation is performed at the maximum capacity; and executing a position control for making the spindle axis perform the decelerated rotation so as to reach the target position at a maximum deceleration corresponding to the maximum acceleration, the residual rotation amount and the current speed, after the spindle axis reaches the intermediate speed, wherein the step to reach the predetermined intermediate speed includes successively updating a velocity command for the velocity control with use of the residual rotation amount and the current speed, and making the spindle axis perform the decelerated rotation by the successively updated velocity command so that the residual rotation amount at an instant when the spindle axis reaches the intermediate speed becomes equal to a positioning rotation amount of the spindle axis required for the spindle axis to reach the target position under the position control, and wherein the step to reach the target position includes calculating a first velocity command for the position control, the first velocity command making the spindle axis perform the decelerated rotation at the maximum deceleration corresponding to the maximum acceleration, during a time except for a predetermined acceleration-varying time just after the spindle axis reaches the intermediate speed or just before the spindle axis reaches the target position, and making the spindle axis perform the decelerated rotation at a variable deceleration lower than the maximum deceleration and varying at a predetermined rate, during the acceleration-varying time;

calculating a second velocity command for the position control, the second velocity command making the spindle axis perform the decelerated rotation at a constant deceleration lower than the maximum deceleration after the spindle axis reaches the intermediate speed; and choosing a velocity command achieving a lower speed, which is either one of the first velocity command and the second velocity command, during a period when the spindle axis operates from the intermediate speed to reach the target position, and wherein the method further comprises the step, executed by the controller, of controlling a feed motion of the feed axis in accordance with a feed axis command and based on the rotational position feedback of the spindle axis.

6. The method of claim 5, wherein a magnitude of the constant deceleration is higher than or equal to one-half of a magnitude of the maximum deceleration.

7. The method of claim 5, wherein the starting position corresponds to a process start position of a tapping process, and wherein the target position corresponds to a target thread depth of the tapping process.

8. The method of claim 5, wherein the starting position corresponds to a target thread depth of a tapping process, and wherein the target position corresponds to a return completion position of the tapping process.

* * * * *